United States Patent
Zhang

(10) Patent No.: US 12,417,014 B2
(45) Date of Patent: Sep. 16, 2025

(54) DISPLAY DEVICES AND METHODS FOR CONTROLLING THE SAME

(71) Applicants: Beijing BOE Technology Development Co., Ltd., Beijing (CN); BOE Technology Group Co., Ltd., Beijing (CN)

(72) Inventor: Hengfei Zhang, Beijing (CN)

(73) Assignees: Beijing BOE Technology Development Co., Ltd., Beijing (CN); BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 17/921,925

(22) PCT Filed: Oct. 28, 2021

(86) PCT No.: PCT/CN2021/127190
§ 371 (c)(1),
(2) Date: Oct. 27, 2022

(87) PCT Pub. No.: WO2023/070472
PCT Pub. Date: May 4, 2023

(65) Prior Publication Data
US 2024/0220099 A1  Jul. 4, 2024

(51) Int. Cl.
*G06F 3/04886* (2022.01)
*B60K 35/10* (2024.01)
(Continued)

(52) U.S. Cl.
CPC ......... *G06F 3/04886* (2013.01); *B60K 35/10* (2024.01); *B60K 35/22* (2024.01);
(Continued)

(58) Field of Classification Search
CPC .... G06F 3/04886; G06F 3/016; G06F 3/0482; G06F 3/0484; B60N 2/0233;
(Continued)

(56) References Cited

U.S. PATENT DOCUMENTS

| 7,982,720 B2 | 7/2011 | Rosenberg et al. |
| 9,740,290 B2 | 8/2017 | Rosenberg et al. |

(Continued)

FOREIGN PATENT DOCUMENTS

| CN | 204506977 U | | 7/2015 |
| CN | 205113412 U | * | 3/2016 |

(Continued)

OTHER PUBLICATIONS

Machine English Translation of CN-205113412-U (Year: 2016).*
PCT/CN2021/127190 international search report.
EP21961837.8 extended European search report dated Jul. 2, 2024.

*Primary Examiner* — Andrew J Cromer
(74) *Attorney, Agent, or Firm* — IPro, PLLC

(57) ABSTRACT

The present disclosure relates to a display device and a method of controlling the display device. The display device includes a display component, a touch component, a response component and a control component. The display component is configured to display a horn page; the touch component is configured to generate a horn touch signal according to a first touching operation occurring on the horn page, and output the horn touch signal to the controller and the response component; the controller is configured to trigger a horn to honk according to the horn touch signal; and the response component is configured to generate a first tactile response according to the horn touch signal while the horn is honking.

17 Claims, 9 Drawing Sheets

(51) Int. Cl.
*B60K 35/22* (2024.01)
*B60K 35/25* (2024.01)
*B60K 35/28* (2024.01)
*B60N 2/02* (2006.01)
*B60Q 5/00* (2006.01)
*G06F 3/01* (2006.01)
*G06F 3/0482* (2013.01)
*G06F 3/0484* (2022.01)

(52) U.S. Cl.
CPC .............. *B60K 35/25* (2024.01); *B60K 35/28* (2024.01); *B60N 2/0233* (2023.08); *B60Q 5/003* (2013.01); *G06F 3/016* (2013.01); *G06F 3/0482* (2013.01); *G06F 3/0484* (2013.01); *B60K 2360/111* (2024.01); *B60K 2360/1438* (2024.01); *B60K 2360/782* (2024.01)

(58) Field of Classification Search
CPC ........ B60K 35/28; B60K 35/10; B60K 35/22; B60K 35/25; B60K 2360/111; B60K 2360/1438; B60K 2360/782; B60Q 5/003
See application file for complete search history.

(56) References Cited

U.S. PATENT DOCUMENTS

| | | | |
|---|---|---|---|
| 2010/0066681 | A1* | 3/2010 | Malabuyo ............... G06F 3/016 345/169 |
| 2010/0318266 | A1 | 12/2010 | Schaaf et al. |
| 2011/0241850 | A1 | 10/2011 | Bosch et al. |
| 2015/0286385 | A1 | 10/2015 | Kim et al. |
| 2019/0071112 | A1* | 3/2019 | Toddenroth ......... B60R 21/2032 |
| 2019/0291769 | A1* | 9/2019 | Kim ...................... G06F 3/0482 |

FOREIGN PATENT DOCUMENTS

| | | |
|---|---|---|
| CN | 109131529 A | 1/2019 |
| CN | 111625088 A | 9/2020 |
| CN | 113002614 A | 6/2021 |

\* cited by examiner

DISPLAY DEVICES AND METHODS FOR CONTROLLING THE SAME

CROSS-REFERENCE TO RELATED APPLICATIONS

This application is a national stage of international PCT Application No. PCT/CN2021/127190 filed on Oct. 28, 2021, the entire contents of which are incorporated herein by reference.

TECHNICAL FIELD

The present disclosure relates to the display field, and in particular to display devices, methods for controlling the same and computer readable storage media.

BACKGROUND

At present, a horn button in a vehicle is a physical button disposed in the center of a steering wheel. For an operation of a user, there is almost no other response except for controlling the horn to honk. Further, in a dark environment, it is difficult for a user to accurately determine a position of the button, bringing inconvenience to pressing the button.

SUMMARY

In view of this, embodiments of the present disclosure provide a display device, a method of controlling the display device and a computer readable storage medium, so as to solve the technical problems in the prior arts.

According to an aspect of embodiments of the present disclosure, there is provided a display device, which can be applied to a steering wheel. The display device includes a display component, a touch component, a response component and a controller. The display component is configured to display a horn page. The touch component is configured to generate a horn touch signal according to a first touching operation occurring on the horn page, and output the horn touch signal to the controller and the response component. The controller is configured to trigger a horn to honk according to the horn touch signal. The response component is configured to generate a first tactile response according to the horn touch signal while the horn is honking.

In an embodiment, the controller is further configured to determine, according to the horn touch signal generated by the touch component, touch intensity of the first touching operation; and in response to determining that the touch intensity is greater than or equal to a touch intensity threshold, trigger the horn to honk.

In an embodiment, the display device includes a touch effective region and the controller is further configured to determine, according to the horn touch signal, a position of the first touching operation; and in response to determining that the position of the first touching operation is within the touch effective region, trigger the horn to honk.

In an embodiment, the response component is further configured to generate visual feedback while the horn is honking.

In an embodiment, the controller is further configured to: in a duration of the first touching operation, control the horn to honk; and/or, at an end of the first touching operation, control the horn to stop honking.

In an embodiment, the touch component is further configured to generate, according to a received first switching operation, a first switching touch signal and send the first switching touch signal to the controller, where the first switching operation includes a touching operation for a seat adjustment identifier in a navigation bar displayed in the display component; the controller is further configured to control, according to the first switching touch signal, the display component to switch from displaying the horn page to displaying a seat adjustment page; the touch component is further configured to generate, according to a second touching operation for the seat adjustment page, an adjustment touch signal and send the adjustment touch signal to the controller and the response component; the controller is further configured to adjust a position of a seat according to the adjustment touch signal; and the response component is further configured to generate, according to the adjustment touch signal, a second tactile response while the position of the seat is being adjusted.

In an embodiment, the seat adjustment page displays a seat position of the seat; the touch component is further configured to send the adjustment touch signal to the display component; and the display component is configured to change, according to the adjustment touch signal, the displayed seat position.

In an embodiment, the seat adjustment page is provided with at least one horizontal position adjustment bar; the touch component is configured to generate, according to the second touching operation for the horizontal position adjustment bar, a first adjustment touch signal, and transmit the first adjustment touch signal to the controller and the response component; the controller is configured to adjust, according to the first adjustment touch signal, a horizontal position of the seat; and the response component is configured to generate, according to the first adjustment touch signal, a tactile response of sliding friction while the horizontal position of the seat is being adjusted.

In an embodiment, the seat adjustment page is provided with at least one seat backrest angle adjustment bar; the touch component is configured to generate, according to the second touching operation for the seat backrest angle adjustment bar, a second adjustment touch signal, and transmit the second adjustment touch signal to the controller and the response component; the controller is configured to adjust, according to the second adjustment touch signal, a seat backrest pitch angle; and the response component is configured to generate, according to the second adjustment touch signal, a tactile response of rotating friction while the seat backrest pitch angle is being adjusted.

In an embodiment, the seat adjustment page is provided with a plurality of adjustment regions; the touch component is further configured to determine a target region where the second touching operation is located from the plurality of adjustment regions, and indicate to the controller that the second touching operation is located in the target region; and the controller is configured to determine an adjustment speed proportion corresponding to the target region, determine an adjustment speed according to the adjustment speed proportion and the adjustment touch signal, and adjust the position of the seat according to the adjustment speed.

In an embodiment, the touch component is further configured to record a length of time during which no operation for the seat adjustment page is received, and in response to determining that the recorded length of time is greater than a first predetermined time length, send a first expiration signal to the controller; and the controller is further configured to control, according to the first expiration signal, the display component to switch from displaying the seat adjustment page to displaying the horn page.

In an embodiment, the touch component is further configured to generate, according to a received second switching operation, a second switching touch signal, and send the second switching touch signal to the controller, where the second switching operation includes a touching operation for a voice call identifier in a navigation bar displayed by the display component; the controller is further configured to control, according to the second switching touch signal, the display component to switch from displaying the horn page to displaying a voice call page; the touch component is further configured to generate, according to a received third touching operation for the voice call page, a call touch signal, and send the call touch signal to the controller and the response component; the controller is further configured to trigger a voice call according to the call touch signal; and the response component is further configured to generate, according to the call touch signal, a third tactile response while the voice call is being triggered.

In an embodiment, the voice call page displays at least a selection region and a call region, and the third touching operation includes a selection touching operation for the selection region and a call touching operation for the call region; the touch component is further configured to generate a selection touch signal according to the received selection touching operation, and send the selection touch signal to the display component and the response component; the display component is further configured to select a target contact according to the selection touch signal, and the response component is further configured to generate a tactile response while the display component is performing the target contact selection; the touch component is further configured to generate a call touch signal according to the received call touching operation, and send the call touch signal to the control component and the response component; the control component is further configured to call the target contact according to the call touch signal; the response component is further configured to generate a tactile response according to the call touch signal while the target contact is being called.

In an embodiment, the call region includes a central region and an edge region; the touch component is configured to generate a first call touch signal according to a call touching operation for the central region, generate a second call touch signal according to a call touching operation for the edge region, and send the first call touch signal and the second call touch signal to the response component; the response component is further configured to generate, according to the first call touch signal and the second call touch signal, different tactile responses respectively.

In an embodiment, the selection touching operation includes a clockwise touching operation or a counterclockwise touching operation, and the response component is configured to generate a tactile response with a sense of pause-move while the display component is performing the target contact selection.

In an embodiment, the touch component is further configured to record a length of time in which no operation for the voice call page is received, and in response to determining that the recorded length of time is greater than a second predetermined time length, send a second expiration signal to the controller; the controller is further configured to control, according the second expiration signal, the display component to switch from displaying the voice call page to displaying the horn page.

According an aspect of embodiments of the present disclosure, there is provided a method of controlling a display device. The display device is applied to a steering wheel. The method includes:
  displaying a horn page in the display device; and
  triggering a horn to honk according to a first touching operation for the horn page, and generating a first tactile response while the horn is honking.

In an embodiment, triggering the horn to honk according to the first touching operation for the horn page includes: according to a horn touch signal generated by a touch component, determining touch intensity of the first touching operation; and in response to determining that the touch intensity is greater than or equal to a touch intensity threshold, triggering the horn to honk.

In an embodiment, the display device includes a touch effective region, and triggering the horn to honk according to the first touching operation for the horn page includes: according to a horn touch signal, determining a position of the first touching operation; in response to determining that the position of the first touching operation is in the touch effective region, triggering the horn to honk.

In an embodiment, the method further includes: generating visual feedback while the horn is honking.

In an embodiment, the method further includes: in a duration of the first touching operation, controlling the horn to honk; and/or, at an end of the first touching operation, controlling the horn to stop honking.

In an embodiment, the method further includes: switching, according to a received first switching operation, from the horn page to a seat adjustment page, where the first switching operation includes a touching operation for a seat adjustment identifier in a navigation bar displayed by the display device; and adjusting a position of a seat according to a second touching operation for the seat adjustment page, and generating a second tactile response while the position of the seat is being adjusted.

In an embodiment, the seat adjustment page displays a seat position of the seat and the method further includes: according to the second touching operation, changing the displayed seat position.

In an embodiment, the seat adjustment page is provided with at least one horizontal position adjustment bar, adjusting the position of the seat according to the second touching operation for the seat adjustment page, and generating the second tactile response while the position of the seat is being adjusted include: adjusting a horizontal position of the seat according to the second touching operation for the horizontal position adjustment bar, and generating a tactile response of sliding friction while the horizontal position of the seat is being adjusted.

In an embodiment, the seat adjustment page is provided with at least one seat backrest angle adjustment bar; adjusting the position of the seat according to the second touching operation for the seat adjustment page, and generating the second tactile response while the position of the seat is being adjusted include: adjusting a pitch angle of the seat according to the second touching operation for the seat backrest angle adjustment bar, and generating a tactile response of rotating friction while the pitch angle of the seat is being adjusted.

In an embodiment, the seat adjustment page is provided with a plurality of adjustment regions, and adjusting the position of the seat according to the second touching operation for the seat adjustment page includes: determining a target region where the second touching operation is located from the plurality of adjustment regions; determining an adjustment speed proportion corresponding to the target region; determining an adjustment speed according to the adjustment speed proportion and an adjustment touch signal; and adjusting the position of the seat according to the adjustment speed.

In an embodiment, the method further includes: recording a length of time during which no operation for the seat adjustment page is received; and in response to determining that the recorded length of time is greater than a first predetermined time length, switching from displaying the seat adjustment page to displaying the horn page.

In an embodiment, the method further includes: according to a received second switching operation, switching from the horn page to a voice call page; triggering a voice call according to a third touching operation for the voice call page, and generating a third tactile response while the voice call is being triggered.

In an embodiment, the voice call page displays at least a selection region and a call region, and the third touching operation includes a selection touching operation for the selection region and a call touching operation for the call region; triggering the voice call according to the third touching operation for the voice call page, and generating the third tactile response while the voice call is being triggered include: according to a received selection touching operation, selecting a target contact, and generating a tactile response while the target contact is being selected; and according to a received call touching operation, calling the target contact, and generating a tactile response while the target contact is being called.

In an embodiment, the call region includes a central region and an edge region, and generating the tactile response while the target contact is being called includes: according to a call touching operation for the central region and a call touching operation for the edge region, generating different tactile responses respectively.

In an embodiment, the selection touching operation includes a clockwise touching operation or a counterclockwise touching operation, and generating the tactile response while the target contact is being selected includes: generating a tactile response with a sense of pause-move while the target contact is being selected.

In an embodiment, the method further includes: recording a length of time during which no operation for the voice call page is received; and in response to determining that the recorded length of time is greater than a second predetermined time length, switching from displaying the voice call page to displaying the horn page.

According to an aspect of embodiments of the present disclosure, there is provided a non-transitory computer readable storage medium, storing a computer program which is executed by a processor to perform steps of the abovementioned methods.

According to the embodiments of the present disclosure, virtualized display can be performed for a button of a vehicle's horn to help a user to more visually determine a position of the button and to operate accurately even in a dark environment. Further, according to the first touching operation for the horn page, the first tactile response can be generated to improve the user's sense of reality in operating the horn, such that the user can quickly determine, based on the first tactile response, that the display device has successfully received the first touching operation.

According to the embodiments of the present disclosure, virtualized display can be performed on one or more keys for adjusting a seat, so as to help the user to visually see the adjustment keys and accurately adjust the seat. Further, according to the second touching operation for the seat adjustment page, the second tactile response can be generated to improve the user's sense of reality for seat adjustment, such that the user can quickly determine based on the second tactile response that the display device has successfully received the second touching operation.

According the embodiments of the present disclosure, the voice call page can be displayed on a steering wheel. When a user wants to perform a voice call, the user can perform an operation directly on the steering wheel without adjusting the gaze direction, thus reducing the potential safety hazard. Further, according to the third touching operation for the voice call page, the third tactile response can be generated to improve the user's sense of reality for voice call, such that the user can quickly determine based on the third tactile response that the display device has successfully received the third touching operation.

BRIEF DESCRIPTION OF THE DRAWINGS

In order to more clearly describe the technical solutions of the embodiments of the present disclosure, accompanying drawings needed for descriptions of the embodiments will be described briefly below. Apparently, the drawings described below are merely some embodiments of the present disclosure. Those skilled in the art may obtain other drawings based on these drawings without making creative work.

FIG. 6B-1 and FIG. 6B-2 are schematic flowcharts of adjusting a seat according to an embodiment of the present disclosure.

DETAILED DESCRIPTION OF THE EMBODIMENTS

Figure 1:
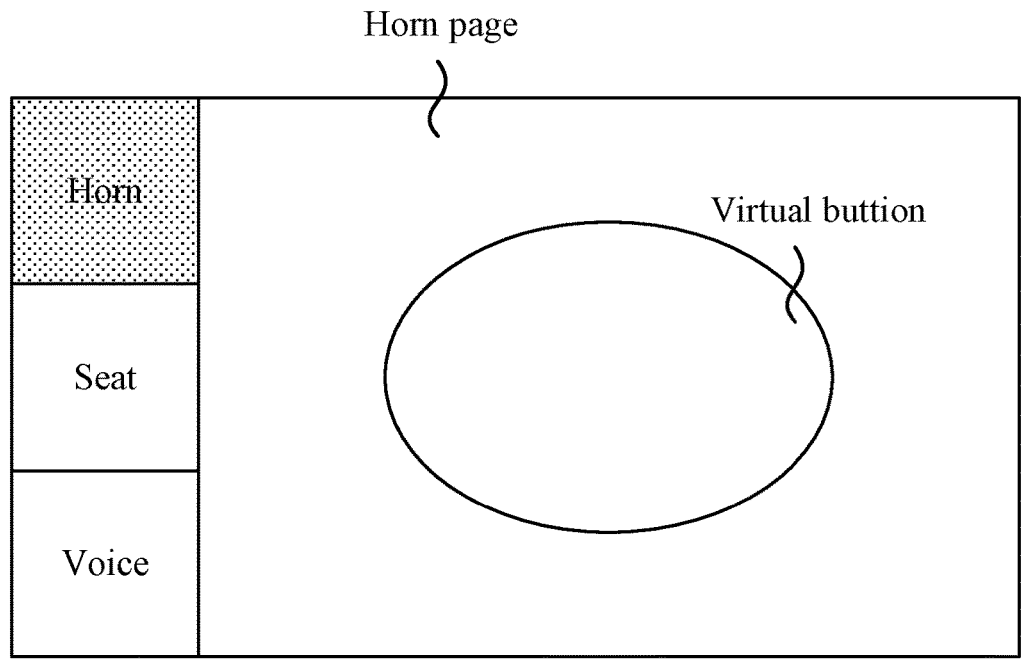
FIG. 1 is a schematic diagram illustrating a horn page according to an embodiment of the present disclosure.

The technical solutions of the embodiments of the present disclosure will be fully and clearly described below in combination with the accompanying drawings in the embodiments of the present disclosure. Apparently, the embodiments described herein are merely some embodiments of the present disclosure rather than all embodiments. All other embodiments obtained by those skilled in the art based on these embodiments of the present disclosure without paying creative work shall all fall within the scope of protection of the present disclosure.

The terms used in the present disclosure are for the purpose of describing a particular example only, and are not intended to limit the present disclosure. The singular forms such as "a", "said", and "the" used in the present disclosure and the appended claims are also intended to include multiple, unless the context clearly indicates otherwise. It is also to be understood that the term "and/or" as used herein refers to and includes any or all possible combinations of one or more associated listed items.

It is to be understood that, although the terms "first", "second", "third" and the like may be used in the present disclosure to describe various information, such information should not be limited to these terms. These terms are only used to distinguish one category of information from another. For example, without departing from the scope of the present disclosure, a first touching operation may be referred as a second touching operation; and similarly, the second touching operation may also be referred as the first touching operation. Depending on the context, the term "if" as used herein may be interpreted as "when" or "upon" or "in response to determining".

For the purpose of concision and ease of understanding, when a size relationship is represented herein, terms used may be "greater than" or "less than", "higher than" or "lower than". Those skilled in the art may understand that the term "no less than" also includes the meaning of "greater than or equal to", and the term "no more than" also includes the meaning of "less than or equal to"; the term "no lower than" includes the meaning of "higher than or equal to" and the term "no higher than" also includes the meaning of "lower than or equal to".

The present disclosure provides a display device which can be applicable to a steering wheel, for example, a steering wheel of a vehicle, a ship and an airplane and the like. With a vehicle as an example mainly, technical solutions of the present disclosure will be illustrated below. A steering wheel may be disposed in the vehicle and the display device may be disposed on the steering wheel, for example, in the exact center of the steering wheel. The display device can include a display component (e.g., a display panel), a touch component (e.g., a touch panel), a response component, a controller and the like. Various components can communicate with each other, and the controller can communicate with each component.

In an embodiment:
the display component is configured to display a horn page;
the touch component is configured to generate, according to a first touching operation occurring on the horn page, a horn touch signal, and output the horn touch signal to the controller and the response component;
the controller is configured to trigger a horn to honk according to the horn touch signal; and
the response component is configured to generate a first tactile response according to the horn touch signal while the horn is honking.

FIG. 1 is a schematic diagram illustrating a horn page according to an embodiment of the present disclosure.

In an embodiment, as shown in FIG. 1, the horn page can be displayed by the display component and the horn page can include a virtual button. In the embodiment shown in FIG. 1, the first touching operation may be a touching operation for the virtual button. For example, in FIG. 1, a region corresponding to the virtual button is located in a center of the horn page, and the region's shape may be a circle as shown in FIG. 1 or may be set to another shape as needed. Further, based on demands, one or more regions may be disposed and parameters such as a position, a shape, an area and the like of the region may be adjusted as well.

The touch component can receive a first touching operation for the horn page from a user, and generate a horn touch signal based on the first touching operation and output the horn touch signal to the controller and the response component. The first touching operation for the horn page may be a touching operation for the virtual button, for example, a press operation. When it is determined that the touch component receives the first touching operation, the controller may send a signal to a horn (e.g., a horn of a vehicle) in a wireless or wired manner, so as to trigger the horn to honk.

On one hand, the controller can trigger the horn to honk based on the horn touch signal, and on the other hand, the response component can generate the first tactile response based on the horn touch signal while the horn is honking. For example, the response component may include piezoelectric patches attached to edges of both sides of the display device, and the vibration of the piezoelectric patches can be controlled to generate a tactile response, so as to improve the user's sense of reality in operating the horn.

According to embodiments of the present disclosure, visualized display can be performed for a button of a vehicle's horn to help a user to more visually determine a position of the button. Even in a dark environment, operations can be accurately performed. Further, according to the first touching operation for the horn page, the first tactile response is generated to improve the user's sense of reality in horn operation, such that the user can quickly determine, based on the first tactile response, that the display device has successfully received the first touching operation.

It is noted that, based on the present embodiment, in addition to performing an operation for the horn page to trigger the horn to honk, other manners may be used to trigger the horn to honk as needed. For example, on the basis of the embodiment shown in FIG. 1, a physical horn button may be disposed, such that a user may not only perform an operation for the horn page to trigger the horn to honk, but also perform an operation (e.g., pressing) for the physical horn button to trigger the horn to honk.

In an embodiment, a pressure sensor may be disposed in the display device as well to sense touch intensity of the first touching operation, such that the controller can control a honk volume of the horn based on the touch intensity. For example, the larger the touch intensity is, the larger the volume is, and the smaller the touch intensity is, the smaller the volume is. Therefore, a user can adjust the honk volume of the horn by controlling the touch intensity of the first touching operation, which is beneficial to control the horn flexibly.

In an embodiment, the controller is further configured to:
determine, according to the horn touch signal generated by the touch component, the touch intensity of the first touching operation; and
in response to determining that the touch intensity is greater than a touch intensity threshold, trigger the horn to honk.

In an embodiment, when the horn page is being displayed, the touch component can generate a horn touch signal carrying information of the touch intensity based on the received first touching operation. In this way, the controller can determine the touch intensity of the first touching operation, and compare the touch intensity with the touch intensity threshold. In a case that the touch intensity is greater than the touch intensity threshold, the controller can determine that the touch intensity is relatively large and the first touching operation is generally not inadvertently triggered, such that the horn can be triggered to honk. While in a case that the touch intensity is less than the touch intensity threshold, the controller can determine that the touch intensity is relatively small and the first touching operation may be inadvertently triggered in a high possibility, and therefore the controller does not trigger the horn to honk. When the touch intensity is equal to the touch intensity threshold, whether to trigger the horn to honk can be set based on needs. Thus, this way helps to prevent the horn from honking due to inadvertent touch of the user.

In an embodiment, the display device may include a touch effective region. The controller is further configured to:
    according to the horn touch signal, determine a position of the first touching operation, and
    in response to determining that the position of the first touching operation is within the touch effective region, trigger the horn to honk.

In an embodiment, the display device may include the touch effective region. For example, in the embodiment shown in FIG. 1, the touch effective region may correspond to a virtual button, and the touch effective region may include an edge, for example, an edge of the corresponding virtual button.

When the horn page is being displayed, the touch component can generate a horn touch signal carrying the position of the first touching operation based on the received first touching operation, such that the controller can determine the position of the first touching operation. For example, the controller can determine whether the position of the first touching operation is within the touch effective region. In a case that the position of the first touching operation is within the touch effective region, the controller may trigger the horn to honk. In a case that the position of the first touching operation is outside the touch effective region, the controller may not trigger the horn to honk. Therefore, this way helps to prevent the user from triggering the horn to honk due to inadvertently touching a region outside the touch effective region.

In an embodiment, the response component is further configured to generate visual feedback while the horn is honking. When the horn touch signal is received, the response component can generate visual feedback while the horn is honking. For example, a ripple diffusion pattern can be generated around the virtual button shown in FIG. 1 as visual feedback, thereby improving the user's sense of reality in horn operation.

In an embodiment, the controller is further configured to:
    in a duration of the first touching operation, control the horn to honk; and/or, at an end of the first touching operation, control the horn to stop honking.

In an embodiment, in the duration of the first touching operation, for example, when the user continuously presses the virtual button in the horn page, the controller can keep sending signals to the horn of the vehicle to continuously trigger the horn to honk. At the end of the first touching operation, for example, when the user stops pressing the virtual button in the horn page, the controller can stop sending signals to the horn of the vehicle, such that the horn can stop honking.

In an embodiment, the touch component is further configured to generate, according to a received first switching operation, a first switching touch signal, and send the first switching touch signal to the controller, where the first switching operation includes a touching operation for a seat adjustment identifier in a navigation bar displayed in the display component.

The controller is further configured to control, according to the first switching touch signal, the display component to switch from displaying the horn page to displaying a seat adjustment page.

The touch component is further configured to generate, according to a second touching operation for the seat adjustment page, an adjustment touch signal, and send the adjustment touch signal to the controller and the response component.

The controller is further configured to adjust a position of a seat according to the adjustment touch signal.

The response component is further configured to generate, according to the adjustment touch signal, a second tactile response while the position of the seat is being adjusted.

Figure 2:
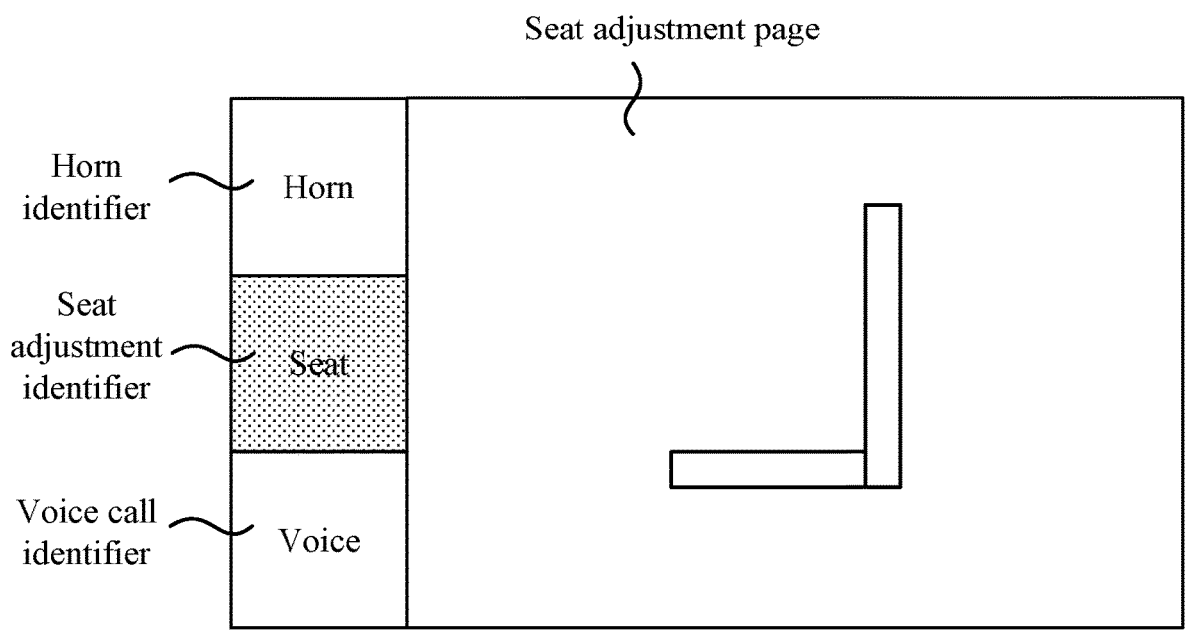
FIG. 2 is a schematic diagram illustrating a seat adjustment page according to an embodiment of the present disclosure.

FIG. 2 is a schematic diagram illustrating a seat adjustment page according to an embodiment of the present disclosure.

In an embodiment, as shown in FIG. 2, in a page displayed by the display component, for example, at a left side of the page, a navigation bar may be displayed and the navigation bar may be provided with identifiers for switching, such as a horn identifier, a seat adjustment identifier and a voice call identifier. A first switching operation may refer to an operation for the seat adjustment identifier, for example, an operation of clicking the seat adjustment identifier.

When the display component displays the horn page, a user may click the seat adjustment identifier as a first switching operation. The touch component can generate a first switching touch signal based on the received first switching operation, and send the first switching touch signal to the controller. Hence, the controller can control the display component to switch from displaying the horn page to displaying the seat adjustment page according to the first switching touch signal.

In an embodiment, a seat pattern may be displayed in the seat adjustment page, and the second touching operation may include an operation of a user for the seat pattern, for example, dragging the seat pattern or clicking a backrest of the seat pattern and rotating the backrest. The touch component can generate an adjustment touch signal according to the second touching operation for the seat adjustment page, and send the adjustment touch signal to the controller and the response component.

The controller can adjust a position of a seat according to the adjustment touch signal from the touch component, for example, adjusting a horizontal position of the seat, a seat backrest pitch angle and the like. In this way, the seat pattern can be dragged in the seat adjustment page to adjust the position of the seat in a horizontal direction, and the backrest can be rotated to adjust the backrest's angle of pitch. Further, while the position of the seat is being adjusted, the response component can further generate a second tactile response based on the adjustment touch signal from the touch component, thereby improving the user's sense of reality in the seat adjustment process.

One or more adjusted seats may include a driver seat or another seat, for example, a co-driver's seat, a seat for persons other than a driver and a co-driver, and the like. These seats can be adjusted separately or in a unified way, which can be selected and set as needed.

At present, the seat adjustment is usually performed by using a physical structure such as a mechanical switch, a physical toggle knob and the like, and these structures are usually located at a side of a seat or even under the seat, so it is inconvenient for the user to view, resulting in inaccurate control.

According to the embodiments of the present disclosure, virtualized display can be performed on one or more the keys for adjusting a seat, so as to help the user to visually see the adjustment keys and accurately adjust the seat. Further, according to the second touching operation for the seat adjustment page, the second tactile response can be generated to improve the user's sense of reality for seat adjustment, such that the user can quickly determine based on the second tactile response that the display device has successfully received the second touching operation.

It is noted that the embodiments relating to the seat adjustment page in the present disclosure can be implemented on the basis of the horn page or independently of the horn page. For example, the seat adjustment page may be displayed in a center of a steering wheel, and the horn may be still controlled by a physical structure. Alternatively, the horn page and the seat adjustment page may be displayed on the steering wheel at the same time, without any switching to display.

In an embodiment, a seat position of a seat is displayed in the seat adjustment page and the touch component is further configured to send the adjustment touch signal to the display component; and the display component is configured to change, according to the adjustment touch signal, the displayed seat position.

The seat adjustment page may display the seat position of the seat, for example, a position of the seat in a horizontal direction (for example, being represented by a distance between the seat's backrest and the steering wheel), an angle of the seat's backrest and the like. The touch component can further send the adjustment touch signal to the display component, such that the display component can change the displayed seat position based on the adjustment touch signal. In this way, the user can visually determine a pose of the seat by watching, so as to accurately adjust the seat.

In an embodiment, the seat adjustment page is provided with at least one horizontal position adjustment bar.

The touch component is configured to generate, according to the second touching operation for the horizontal position adjustment bar, a first adjustment touch signal, and transmit the first adjustment touch signal to the controller and the response component;
the controller is configured to adjust, according to the first adjustment touch signal, a horizontal position of the seat; and
the response component is configured to generate, according to the first adjustment touch signal, a tactile response of sliding friction while the horizontal position of the seat is being adjusted.

In an embodiment, the seat adjustment page is provided with at least one seat backrest angle adjustment bar;
the touch component is configured to generate, according to the second touching operation for the seat backrest angle adjustment bar, a second adjustment touch signal, and transmit the second adjustment touch signal to the controller and the response component;
the controller is configured to adjust, according to the second adjustment touch signal, a seat backrest pitch angle; and
the response component is configured to generate, according to the second adjustment touch signal, a tactile response of rotating friction while the seat backrest pitch angle is being adjusted.

Figure 3A:
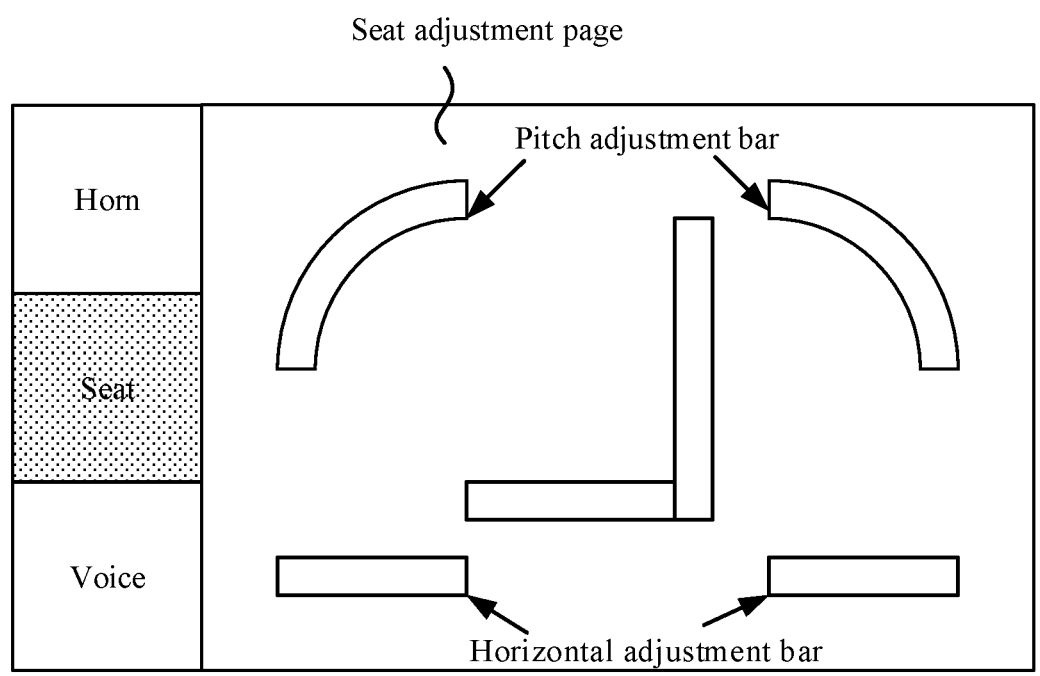
FIG. 3A is a schematic diagram illustrating another seat adjustment page according to an embodiment of the present disclosure.

FIG. 3A is a schematic diagram illustrating another seat adjustment page according to an embodiment of the present disclosure.

As shown in FIG. 3A, the seat adjustment page may be provided with two horizontal position adjustment bars, and may also be provided with two seat backrest angle adjustment bars. A user can adjust a seat by operating the adjustment bars. A horizontal position adjustment bar' shape may be a straight line as shown in FIG. 3A, or may be set to another shape as needed. A seat backrest angle adjustment bar's shape may be an arc as shown in FIG. 3A, or may be set to another shape as needed.

For example, when the user performs a second touching operation for the horizontal position adjustment bar, the touch component can generate a first adjustment touch signal, and send the first adjustment touch signal to the controller and the response component. The controller can adjust a horizontal position of the seat based on the first adjustment touch signal, and the response component can generate a tactile response of sliding friction based on the first adjustment touch signal while the horizontal position of the seat is being adjusted.

For example, when the user performs a second touching operation for the seat backrest angle adjustment bar, the touch component can generate a second adjustment touch signal, and send the second adjustment touch signal to the controller and the response component. The controller can adjust an angle of pitch for the seat's backrest based on the second adjustment touch signal, and the response component can generate a tactile response of rotating friction based on the second adjustment touch signal while the seat's angle of pitch is being adjusted.

Since the adjustment bar is larger in area than a seat pattern, operating the adjustment bar can be easier than operating the seat pattern directly. Positions and the number of the adjustment bars may be as shown in FIG. 3A, or the positions and the number of the adjustment bars may be adjusted as needed.

Figure 3B:
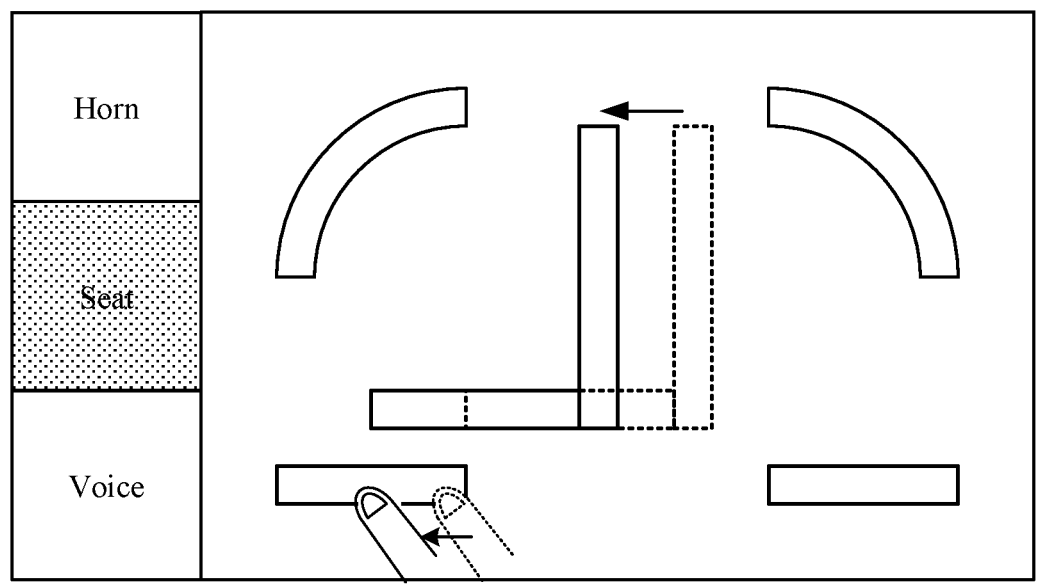
FIG. 3B is a schematic diagram illustrating a process of adjusting a seat according to an embodiment of the present disclosure.
Figure 3C:
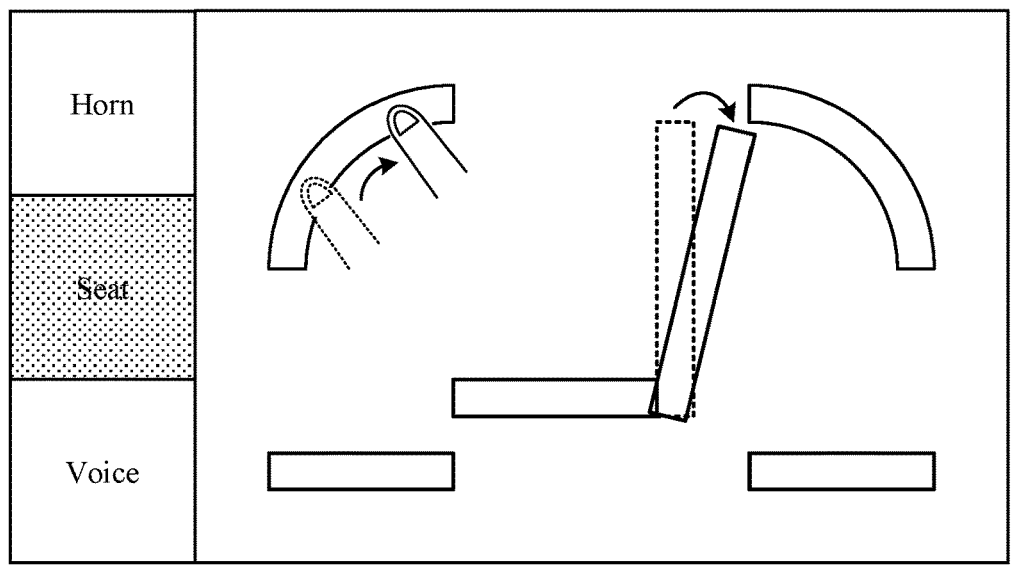
FIG. 3C is a schematic diagram illustrating another process of adjusting a seat according to an embodiment of the present disclosure.

FIG. 3B is a schematic diagram illustrating a seat adjustment process according to an embodiment of the present disclosure. FIG. 3C is a schematic diagram illustrating another seat adjustment process according to an embodiment of the present disclosure.

A user may perform a second touching operation on a horizontal position adjustment bar, for example, sliding on the horizontal position adjustment bar to adjust a position of a seat. For example, in the embodiment shown in FIG. 3A, the user may slide leftward on the horizontal position adjustment bar to adjust the seat to move forward, and may slide rightward on the horizontal position adjustment bar to adjust the seat to move backward. For example, as shown in FIG. 3B, sliding leftward on the horizontal position adjustment bar can adjust the seat to move forward.

When the user performs the second touching operation on the horizontal position adjustment bar, since the horizontal position adjustment bar's shape indicates a straight line, the second touching operation can be an operation of sliding along a straight line, and the response component can generate a tactile response of sliding friction based on the second touching operation. In this way, the user can accurately sense a degree of the sliding operation based on the tactile response without watching an operation on the display device, thus helping to prevent the user from distracting in a driving process and improving the driving safety.

The user may perform a second touching operation on a seat backrest angle adjustment bar, for example, sliding on the seat backrest angle adjustment bar to adjust the position of the seat. For example, in the embodiment shown in FIG. 3A, the user may slide counterclockwise on the seat backrest angle adjustment bar to adjust the seat to tilt forward, and may slide clockwise on the seat backrest angle adjustment bar to adjust the seat to tilt backward. For example, as shown in FIG. 3C, sliding clockwise on the seat backrest angle adjustment bar can adjust the seat to tilt backward.

When the user performs the second touching operation on the seat backrest angle adjustment bar, since the seat backrest angle adjustment bar's shape is an arc, the second touching operation can be a rotating operation, and the response component can generate a tactile response of rotating friction based on the second touching operation. In this way, the user can accurately sense a degree of the rotating operation based on the tactile response without watching an operation on the display device, thus helping to prevent the user from distracting in a driving process and improving the driving safety.

In an embodiment, there are two horizontal position adjustment bars, which are symmetrically arranged at the right and left sides of the seat adjustment page; and/or, there are two seat backrest angle adjustment bars, which are symmetrically arranged at the left and right sides of the seat adjustment page.

The number of horizontal position adjustment bar(s) may be one or two, and can also be set to be more as needed. For example, when there are two horizontal position adjustment bars, the two horizontal position adjustment bars may be symmetrically arranged at the left and right sides of the seat adjustment page (e.g., the lower left corner and the lower right corner) as shown in FIG. 3A. A user may choose, based on needs, to perform an operation on the left horizontal position adjustment bar or the right horizontal position adjustment bar, which helps the user to flexibly choose a left or right hand for operation.

The number of seat backrest angle adjustment bar(s) may be one or two, and can also be set to be more as needed. For example, when there are two seat backrest angle adjustment bars, the two seat backrest angle adjustment bars may be symmetrically arranged at the left and right sides of the seat adjustment page (e.g., the upper left corner and the upper right corner) as shown in FIG. 3A. A user may choose, based on needs, to perform an operation on the left seat backrest angle adjustment bar or the right seat backrest angle adjustment bar, which helps the user to flexibly select choose the left or right hand for operation.

In an embodiment, the seat adjustment page is provided with a plurality of adjustment regions.

The touch component is further configured to determine a target region where the second touching operation is located from the plurality of adjustment regions, and indicate to the controller that the second touching operation is located in the target region.

The controller is configured to determine an adjustment speed proportion corresponding to the target region, determine an adjustment speed according to the adjustment speed proportion and the adjustment touch signal, and adjust the position of the seat according to the adjustment speed.

In an embodiment, a plurality of adjustment regions may be set in the seat adjustment page, and an adjustment speed corresponding to each adjustment region can be set. For example, with the horizontal position adjustment bar at the lower left corner in the embodiment shown in FIG. 3A as an example, the horizontal position adjustment bar may be equally divided into left and right adjustment regions. The left half region may correspond to a larger adjustment speed proportion, for example, 4, and the right half region may correspond to a smaller adjustment speed proportion, for example, 2.

When the user performs a sliding operation on the horizontal position adjustment bar, the touch component can determine a target region where the sliding operation is located from the plurality of adjustment regions, and indicate to the controller that the sliding operation is in the target region. In this way, the controller can determine an adjustment speed proportion corresponding to the target region, determine an adjustment speed based on the adjustment speed proportion and the adjustment touch signal, and adjust the position of the seat based on the determined adjustment speed.

It is noted that the adjustment speed can be also affected by a speed of the second touching operation, for example, the faster the speed of the second touching operation is, the faster the adjustment speed is. To describe the adjustment speed proportion, the following descriptions are made with a case that the speed at which the user performs the second touching operation remains unchanged.

For example, when the user slides on the right half part of the horizontal position adjustment bar, the user's sliding speed can be 1 cm/s, and the controller can determine that an adjustment speed proportion corresponding to the right half region is 2. The controller can determine the adjustment speed as 1×2=2 cm/s based on the adjustment speed proportion and the adjustment touch signal. In this case, the horizontal position of the seat can be adjusted at a speed of 2 cm/s.

For example, when the user slides at a speed of 1 cm/s on the left half part of the horizontal position adjustment bar, the controller can determine that an adjustment speed proportion corresponding to the left half region is 4. The controller can determine the adjustment speed as 1×4=4 cm/s based on the adjustment speed proportion and the adjustment touch signal. In this case, the horizontal position of the seat can be adjusted at a speed of 4 cm/s.

Therefore, for the user performs second touching operations at different positions, even if the second touching operations are same, different adjustment speeds can be realized, so as to improve the operation flexibility of the user for seat adjustment.

In an embodiment, the touch component is further configured to record a length of time during which no operation for the seat adjustment page is received, and in response to determining that the recorded length of time is greater than a first predetermined time length, send a first expiration signal to the controller; and the controller is further configured to control, according to the first expiration signal, the display component to switch from displaying the seat adjustment page to displaying the horn page.

When the display component is displaying the seat adjustment page, the touch component can record a length of time in which no operation is received. In response to determining that the length of time in which no operation is received is greater than the first predetermined time length, a first expiration signal can be sent to the controller, indicating that the user would not adjust the seat in a period of time. The controller can automatically control the display component to switch from displaying the seat adjustment page to displaying the horn page, so as to restore a function that a page displayed by the display device serves as a virtual button of a horn.

In an embodiment, the touch component is further configured to generate, according to a received second switching operation, a second switching touch signal, and send the second switching touch signal to the controller, where the second switching operation includes a touching operation for a voice call identifier in a navigation bar displayed by the display component;

the controller is further configured to control, according to the second switching touch signal, the display component to switch from displaying the horn page to displaying a voice call page;

the touch component is further configured to generate, according to a received third touching operation for the voice call page, a call touch signal, and send the call touch signal to the controller and the response component;

the controller is further configured to trigger a voice call according to the call touch signal; and the response component is further configured to generate, according to the call touch signal, a third tactile response while the voice call is being triggered.

Figure 4:
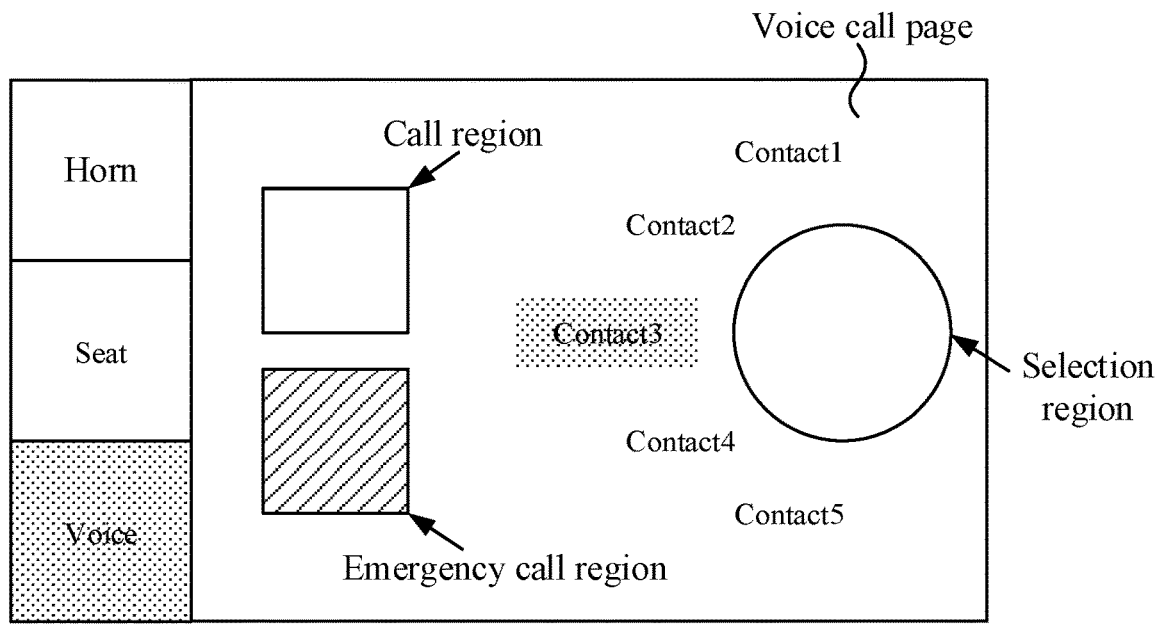
FIG. 4 is a schematic diagram illustrating a voice call page according to an embodiment of the present disclosure.

FIG. 4 is a schematic diagram illustrating a voice call page according to an embodiment of the present disclosure.

In an embodiment, as shown in FIG. 4, in a page displayed by the display device, for example, at a left side of the page, a navigation bar may be displayed and the navigation bar may be provided with identifiers for switching, such as a horn identifier, a seat adjustment identifier and a voice call identifier. A second switching operation may refer to an operation for the voice call identifier, for example, an operation of clicking the voice call identifier.

When the display device displays the horn page, a user may click the voice call identifier as a second switching operation. The touch component can generate a second switching touch signal based on the received second switching operation, and send the second switching touch signal to the controller. Hence, the controller can control the display component to switch from displaying the horn page to displaying the voice call page according to the second switching touch signal.

For example, in the voice call page, icons of contacts and dial keys may be displayed, and the third touching operation may include operations such as a user selecting a contact, clicking a dial key and the like. The touch component can generate a call touch signal according to the third touching operation for the voice call page, and send the call touch signal to the controller and the response component.

The controller can trigger a voice call based on the call touch signal from the touch component, for example, dialing the selected contact's number to initiate a voice call. In addition, the response component can generate a third tactile response based on the call touch signal from the touch component while the voice call is being triggered, so as to improve the user's sense of reality for the voice call process.

At present, since voice call keys are usually located in a central control region in right front of a driver, when the driver wants to initiate a voice call, the driver needs to turn his field of view to the right front to see and operate the voice call keys. In this case, the driver basically loses his field of view in a vehicle travelling direction, leading to significant potential safety hazard.

According to the embodiments of the present disclosure, a voice call page may be displayed on a steering wheel. When a user wants to perform a voice call, the user can perform an operation directly on the steering wheel without adjusting the gaze direction, thus reducing the potential safety hazard. Further, according to the third touching operation for the voice call page, the third tactile response can be generated to improve the user's sense of reality for a voice call operation, such that the user can quickly determine, based on the third tactile response, that the display device has successfully received the third touching operation.

It is noted that the embodiments relating to the voice call page in the present disclosure can be implemented on the basis of the horn page or independently of the horn page. For example, the voice call page may be displayed in a center of a steering wheel, and the horn may be still controlled by a physical structure. Alternatively, the horn page and the voice call page may be displayed on the steering wheel at the same time, without any switching to display.

In an embodiment, the voice call page displays at least a selection region and a call region, and the third touching operation includes a selection touching operation for the selection region and a call touching operation for the call region;

the touch component is further configured to generate a selection touch signal according to the received selection touching operation, and send the selection touch signal to the display component and the response component; the display component is further configured to select a target contact according to the selection touch signal, and the response component is further configured to generate a tactile response while the display component is performing the target contact selection; and the touch component is further configured to generate a call touch signal according to the received call touching operation, and send the call touch signal to the control component and the response component; the control component is further configured to call the target contact according to the call touch signal; and the response component is further configured to generate a tactile response according to the call touch signal, while the target contact is being called.

In an embodiment, as shown in FIG. 4, a selection region and a call region may be displayed in the voice call page. For example, the selection region may include one or more selection keys and contacts, and the call region may include one or more call keys. As shown in FIG. 4, the selection keys shapes may be circles and the call keys' shapes may be rectangles. The keys may also be in other shapes as needed.

For example, when a user performs an operation on the selection region, the touch component can generate, according to the received selection touching operation, a selection touch signal, and send the selection touch signal to the display component and the response component. The display component can select a target contact in a displayed picture based on the selection touch signal, and the response component can generate a tactile response based on the selection touch signal, while the display component is performing the target contact selection.

For example, when the user performs an operation on the call region, the touch component can generate, according to the received call touching operation, a call touch signal, and send the call touch signal to the control component and the response component. The control component can call the target contact based on the call touch signal, and the response component can generate a tactile response based on the call touch signal, while the target contact is being called.

Thus, the user may perform an operation on the selection region to select a target contact, for example, sliding counterclockwise or clockwise in the virtual button shown in FIG. 4 to select a target contact from a plurality of contacts. For example, the selected target contact may be contact 3 shown in FIG. 4 and displayed in a highlighted form. Furthermore, when the target contact is selected, the target contact can be called by performing an operation on the call region, for example, by clicking a call key to trigger dialing a number corresponding to the target contact.

In an embodiment, the voice call page may display an emergency call region. The touch component can be further configured to generate, according to a touching operation for the emergency call region, an emergency call signal, and send the emergency call signal to the controller and the response component. The controller can be further configured to call, according to the emergency call signal, a predetermined emergency contact, and the response component can generate a tactile response while the emergency contact is being called.

The voice call page may further display an emergency call region, for example, an emergency call button under the call region as displayed in FIG. 4. A user can perform a touching operation on the emergency call region to call an emergency contact. The emergency contact's number may be pre-stored and can be dialed without making selection. The emergency contact's number may include, but is not limited to 110, 119, 120 and the like, which can be set based on needs.

In an embodiment, the call region includes a central region and an edge region.

The touch component is configured to generate a first call touch signal according to a call touching operation for the central region, generate a second call touch signal according to a call touching operation for the edge region, and send the first call touch signal and the second call touch signal to the response component.

The response component is further configured to generate, according to the first call touch signal and the second call touch signal, different tactile responses respectively.

When a user performs an operation on the call region, it is possible that the user does not press the central region of the call region accurately at one time but presses the edge region of the call region. Considering this case, for the user's touching operation on the central region and the user's touching operation on the edge region, the response component can be controlled to generate different tactile responses.

For example, a tactile response intensity of the edge region may be relatively large, and a tactile response intensity of the central region may be relatively small. The tactile response intensity may be reflected by parameters such as a vibration frequency and a vibration amplitude and the like of a piezoelectric patch. For example, the vibration frequency and the vibration amplitude can be positively correlated with the response intensity respectively.

Thus, when the user presses the edge region, the touch component can generate the second call touch signal, and send the second call touch signal to the controller and the response component. The controller does not trigger calling the target contact, and the response component can generate a relatively strong vibration, such that the user can feel a relatively strong tactile response and experience a feeling of edges.

When the user presses the central region, the touch component can generate the first call touch signal, and send the first call touch signal to the controller and the response component. The controller can trigger calling the target contact, and the response component can generate a relatively mild vibration, such that the user can feel a relatively mild tactile response and experience pressing touch.

In this way, the user can accurately identify the touched region based on the tactile response, so as to memorize positions of the edge region and the central region in the call region. Subsequently, the user can relatively accurately operate the central region to trigger a call without directly watching the page. Therefore, the operation efficiency and accuracy can be improved, and on the other hand, the user can be prevented from being distracted during driving, thus improving the driving safety.

In an embodiment, the selection touching operation includes a clockwise touching operation or a counterclockwise touching operation, and the response component is configured to generate a tactile response with a sense of pause-move while the display component is performing the target contact selection.

When a user performs an operation on a circular selection region, because what's performed is a clockwise or counterclockwise rotating operation, the user may not accurately determine a rotation angle, resulting in selecting a wrong contact. In this case, when the user performs a touching operation on the selection region, the response component can generate a tactile response with a sense of pause-move based on the second call touch signal.

For example, the selection operation may correspond to a plurality of rotation angles, and response intensities corresponding to the plurality of rotation angles are different. For example, with two response intensities as an example, a tactile response intensity may be reflected by parameters such as a vibration frequency and a vibration amplitude and the like of a piezoelectric patch. For example, the vibration frequency and the vibration amplitude can be positively correlated with the response intensity.

When the user performs a rotating operation on the selection region, a rotation angle of the user's finger with respect to a center of the selection region can change and a tactile response with varying intensities can be felt, leading to a sense of pause-move. In this way, the user can accurately determine the rotated angle based on the tactile response, so as to accurately perform an operation without directly watching the page. Therefore, the operation efficiency and accuracy can be improved, and on the other hand, the user can be prevented from being distracted during driving, thus improving the drive safety.

In an embodiment, the touch component is further configured to record a length of time in which no operation for the voice call page is received, and in response to determining that the recorded length of time is greater than a second predetermined time length, send a second expiration signal to the controller.

The controller is further configured to control, according to the second expiration signal, the display component to switch from displaying the voice call page to displaying the horn page.

When the display component is displaying the voice call page, the touch component can record a length of time in which no operation is received. In a case that the recorded length of time is greater than the second predetermined time length, the second expiration signal can be sent to the controller, indicating that the user would not make a voice call in a period of time. The controller can automatically control the display component to switch from displaying the voice call page to displaying the horn page, so as to restore a function that a page displayed by the display device serves as a virtual button of a horn.

The user may also click a horn identifier manually as needed, such that the display device can switch from displaying the voice call page to displaying the horn page.

Corresponding to the above display devices, the present disclosure further provides embodiments of a method of controlling the display device.

Figure 5A:
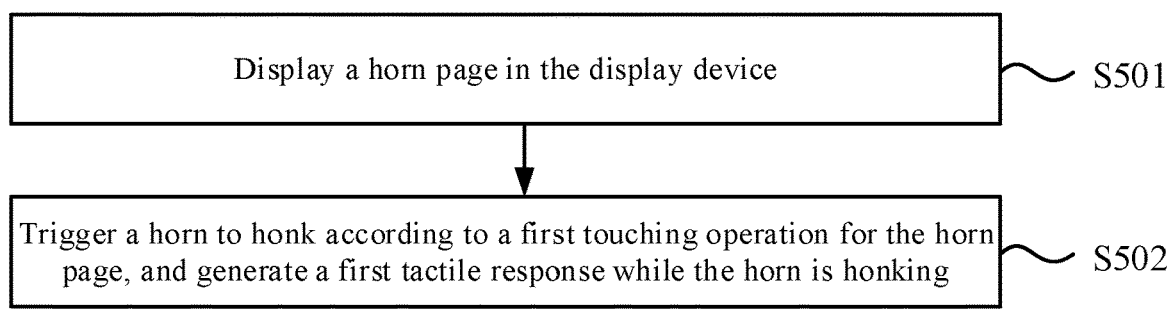
FIG. 5A is a schematic flowchart illustrating a method of controlling a display device according to an embodiment of the present disclosure.

FIG. 5A is a schematic flowchart illustrating a method of controlling a display device according to an embodiment of the present disclosure. The display device in this embodiment may be applied to a steering wheel, for example, a steering wheel of a vehicle, a ship, and an airplane and the like. With a vehicle as an example, technical solutions of the present disclosure will be illustrated below. A steering wheel may be disposed in the vehicle and the display device may be disposed on the steering wheel, for example, in the exact center of the steering wheel. The display device can include a display component (e.g., a display panel), a touch component (e.g., a touch panel), a response component, a controller and the like. Various components can communicate with each other, and the controller can communicate with each component.

As shown in FIG. 5A, the method may include the following steps.

At step S501, a horn page is displayed in the display device.

At step S502, a horn is triggered to honk according to a first touching operation for the horn page, and a first tactile response is generated while the horn is honking.

In an embodiment, triggering the horn to honk according to the first touching operation for the horn page includes:
according to a horn touch signal generated by a touch component in the display device, determining touch intensity of the first touching operation; and in response to determining that the touch intensity is greater than or equal to a touch intensity threshold, triggering the horn to honk.

In an embodiment, the display device includes a touch effective region, and triggering the horn to honk according to the first touching operation for the horn page includes:
according to the horn touch signal, determining a position of the first touching operation; in response to determining that the position of the first touching operation is in the touch effective region, triggering the horn to honk.

In an embodiment, the method further includes:
generating visual feedback while the horn is honking.

In an embodiment, the method further includes, in a duration of the first touching operation, controlling the horn to honk; and/or at the end of the first touching operation, controlling the horn to stop honking.

Figure 5B:
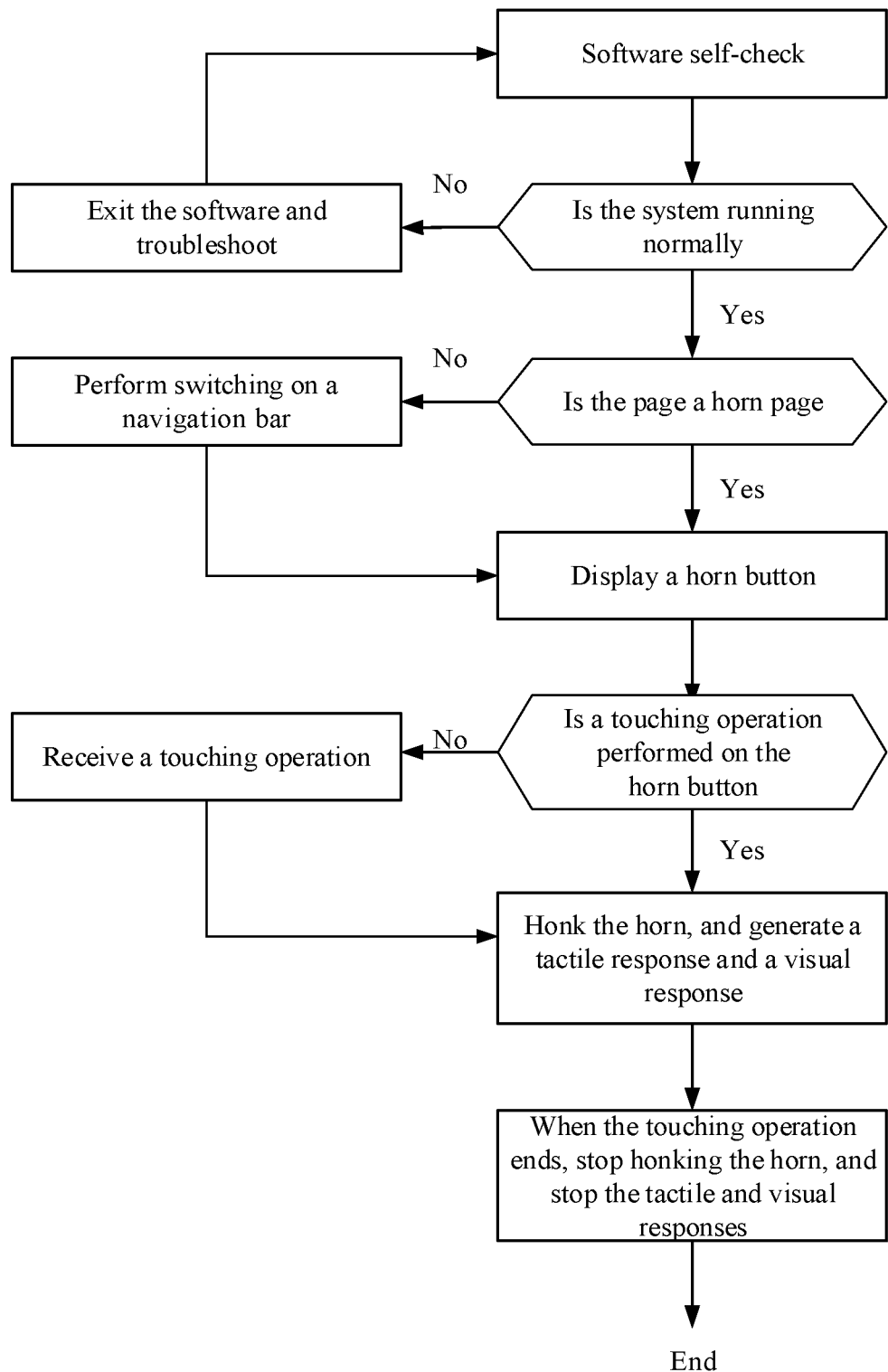
FIG. 5B is a schematic flowchart of controlling a horn to honk according to an embodiment of the present disclosure.

With an example, a case that the display device displays the horn page is relatively systematically described below. FIG. 5B is a schematic flowchart of controlling a horn to honk according to an embodiment of the present disclosure.

Firstly, the display device can start a software and perform self-check to determine whether a system runs normally. In a case that the system does not run normally, the display device can exit the software and try to remove system faults. In a case that the system runs normally, it can be further determined whether the currently-displayed page is the horn page. In response to determining that the page is not the horn page, a user can perform a switching operation on a navigation bar as needed, such that the horn page can be switched to and displayed. In response to determining that the page is the horn page, a virtual horn button can be displayed in the page.

Further, whether a touch event for the displayed horn button occurs can be determined. In a case that the determination indicates "no", the display device can continue waiting for receiving a touch event. In a case that the determination indicates "yes", the horn can be triggered to honk, and a tactile response and a visual response can be generated, for example, vibration is generated and an acoustic wave diffusion pattern is displayed. At the end of the touch event, the horn can stop honking, and the corresponding tactile response and visual response can be stopped, and the horn page can be restored to an initial state.

Figure 6A:
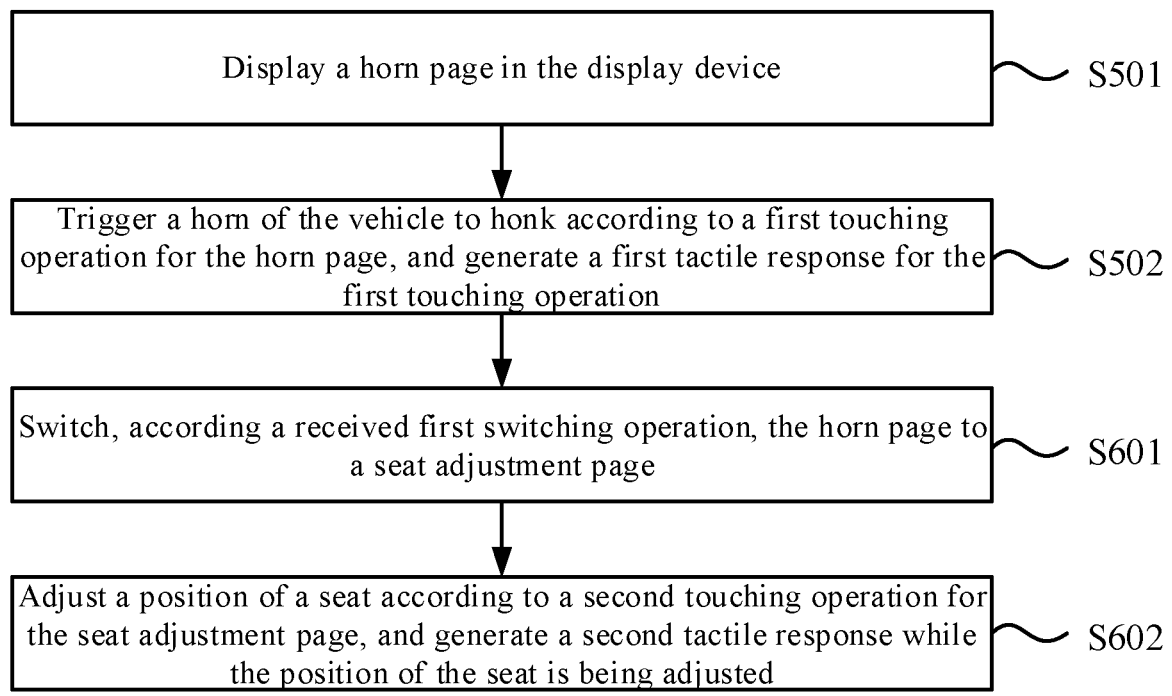
FIG. 6A is a schematic flowchart illustrating another method of controlling a display device according to an embodiment of the present disclosure.

FIG. 6A is a schematic flowchart illustrating another method of controlling a display device according to an embodiment of the present disclosure. As shown in FIG. 6A, the method may further include the following steps.

At step S601, according a received first switching operation, the horn page is switched to a seat adjustment page, where the first switching operation includes a touching operation for a seat adjustment identifier in a navigation bar displayed by the display device.

At step S602, according to a second touching operation for the seat adjustment page, a position of a seat is adjusted, and a second tactile response is generated while the position of the seat is being adjusted.

In an embodiment, the seat adjustment page displays a seat position of the seat and the method may include:
according to the second touching operation, changing the displayed seat position.

In an embodiment, the seat adjustment page is provided with at least one horizontal position adjustment bar, according to the second touching operation for the seat adjustment page, adjusting the position of the seat, and generating the second tactile response while the position of the seat is being adjusted may include:
according to the second touching operation for the horizontal position adjustment bar, adjusting a horizontal position of the seat, and generating a tactile response of sliding friction while the horizontal position of the seat is being adjusted.

In an embodiment, the seat adjustment page is provided with at least one seat backrest angle adjustment bar; according to the second touching operation for the seat adjustment page, adjusting the position of the seat and generating the second tactile response while the position of the seat is being adjusted may include:
according to the second touching operation for the seat backrest angle adjustment bar, adjusting a pitch angle of the seat, and generating a tactile response of rotating friction while the pitch angle of the seat is being adjusted.

In an embodiment, the seat adjustment page is provided with a plurality of adjustment regions, and adjusting the position of the seat according to the second touching operation for the seat adjustment page can include:
determining a target region where the second touching operation is located from the plurality of adjustment regions;
determining an adjustment speed proportion corresponding to the target region;
determining an adjustment speed according to the adjustment speed proportion and an adjustment touch signal generated based on the second touching operation; and adjusting the position of the seat according to the adjustment speed.

In an embodiment, the method can further include:
recording a length of time in which no operation for the seat adjustment page is received; and in response to determining that the recorded length of time is greater than a first predetermined time length, switching from displaying the seat adjustment page to displaying the horn page.

Figures 1, 6B:
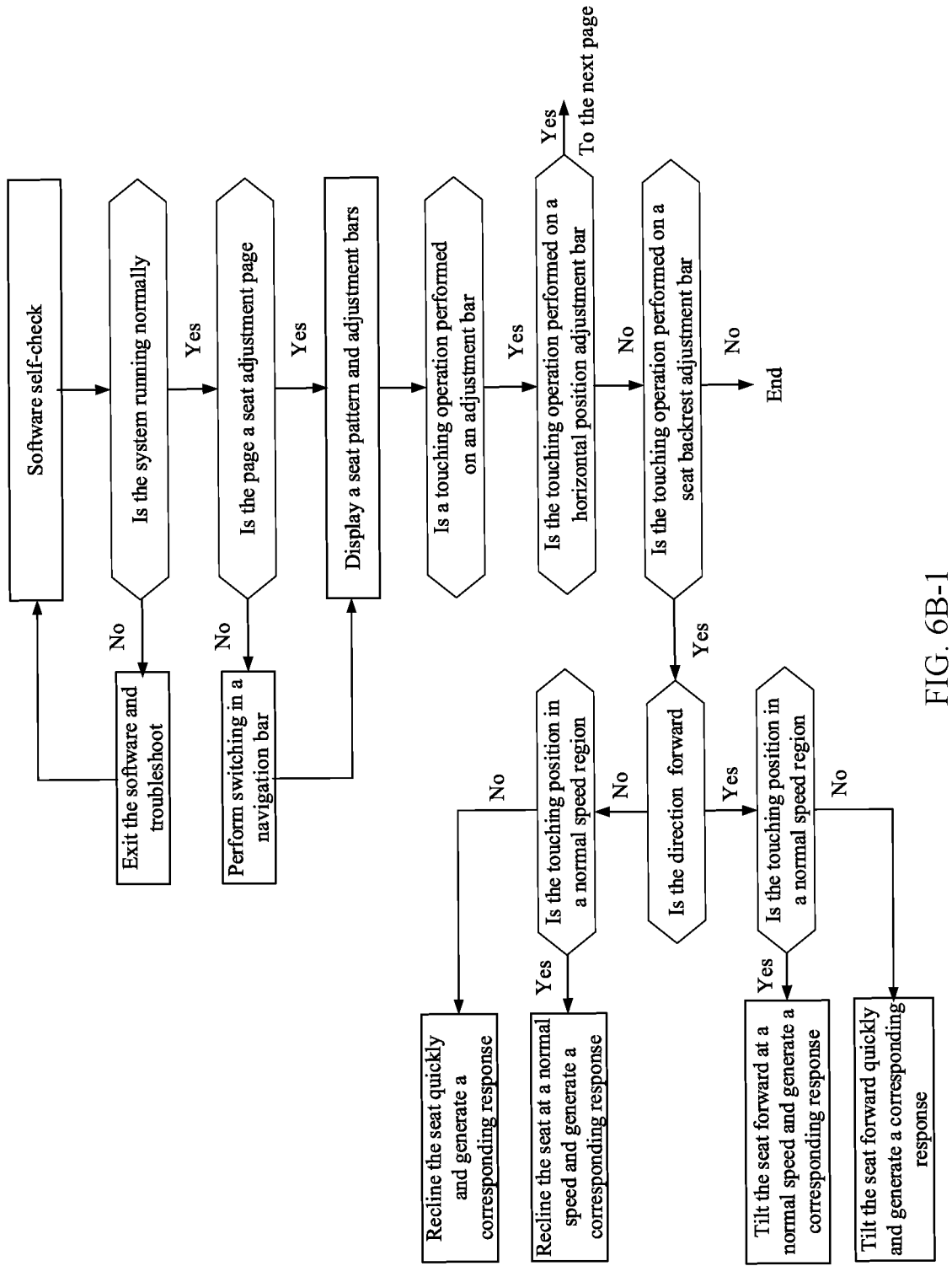
Figures 2, 6B:
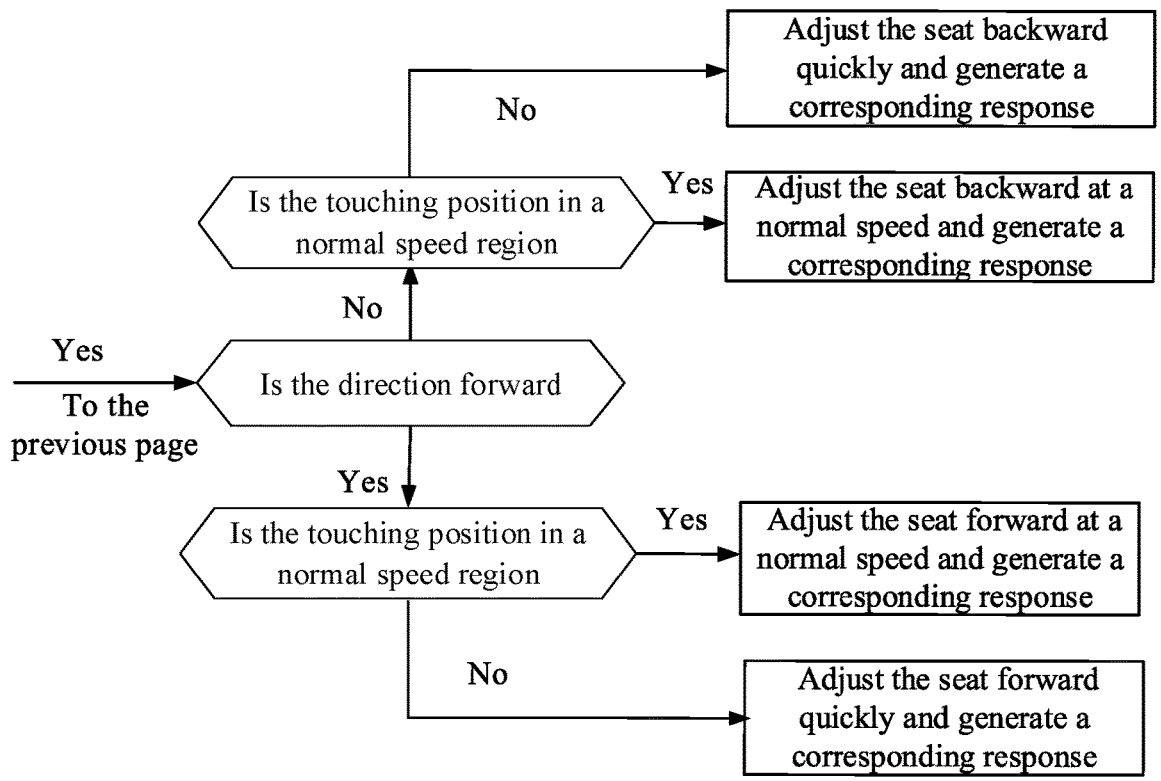

With an example, a case that the display device displays a seat adjustment page is relatively systematically described below. FIG. 6B-1 and FIG. 6B-2 are schematic flowcharts of adjusting a seat according to an embodiment of the present disclosure.

Firstly, the display device can start a software and perform self-check to determine whether a system runs normally. In a case that the system does not run normally, the display device can exit the software and try to remove system faults. In a case that the system runs normally, it can be further determined whether the currently-displayed page is the seat adjustment page. In response to determining that the page is not the seat adjustment page, a user can perform a switching operation on a navigation bar as needed to switch to displaying the seat adjustment page. In response to determining that the page is the seat adjustment page, a seat pattern and four adjustment bars can be displayed in the page, for example, as shown in FIG. 3A.

Further, whether a touch event for the adjustment bars occurs can be determined. In a case that a touch event occurs, whether the touch event is a touch event for a horizontal position adjustment bar or a seat backrest angle adjustment bar can be determined further.

In response to determining that the touch event is a touch event for the horizontal position adjustment bar, whether a direction of the touching operation indicates forward adjustment can be further determined.

In a case of indicating forward adjustment, an adjustment speed proportion corresponding to a region where a touching position is located can be further determined. For example, based on adjustment speed proportions, regions may be divided into two types, a normal speed region or a fast speed region.

In response to determining that the touching position is in a normal speed region, a seat may be controlled to move forward at a normal speed, and visual feedback and tactile feedback of moving the seat forward at a normal speed can be generated in the horizontal position adjustment bar. In response to determining that the touching position is in a fast speed region, the seat may be controlled to move forward at a fast speed, and visual feedback and tactile feedback of moving the seat forward quickly can be generated in the horizontal position adjustment bar.

In a case of not indicating forward adjustment, the adjustment speed proportion corresponding to the region where the touching position is located can be determined as well.

In response to determining that the touching position is in a normal speed region, the seat may be controlled to move backward at a normal speed, and visual feedback and tactile feedback of moving the seat backward at a normal speed can be generated in the horizontal position adjustment bar. In response to determining that the touching position is in a fast speed region, the seat may be controlled to move backward at a fast speed, and visual feedback and tactile feedback of moving the seat backward quickly can be generated in the horizontal position adjustment bar.

In response to determining that the touch event is a touch event for the seat backrest angle adjustment bar, it can be further determined whether a direction of the touching operation indicates forward adjustment, namely, adjusting a backrest of a seat to tilt forward.

In a case of indicating forward adjustment, an adjustment speed proportion corresponding to a region where a touching position is located can be further determined. For example, based on adjustment speed proportions, regions may be divided into two types, a normal speed region and a fast speed region.

In response to determining that the touching position is in a normal speed region, the backrest of the seat may be controlled to tilt forward at a normal speed, and visual feedback and tactile feedback of tilting the seat backrest forward at a normal speed can be generated in the seat backrest angle adjustment bar. In response to determining that the touching position is in a fast speed region, the backrest of the seat may be controlled to tilt forward at a fast speed, and visual feedback and tactile feedback of tilting the seat backrest forward quickly can be generated in the seat backrest angle adjustment bar.

In a case of not indicating forward adjustment, an adjustment speed proportion corresponding to a region where the touching position is located can be determined as well.

In response to determining that the touching position is in a normal speed region, the backrest of the seat may be controlled to tilt backward at a normal speed, and visual feedback and tactile feedback of tilting the seat backrest backward at a normal speed can be generated in the seat backrest angle adjustment bar. In response to determining that the touching position is in a fast speed region, the backrest of the seat may be controlled to tilt backward at a fast speed, and visual feedback and tactile feedback of tilting the seat backrest backward quickly can be generated in the seat backrest angle adjustment bar.

Figure 7A:
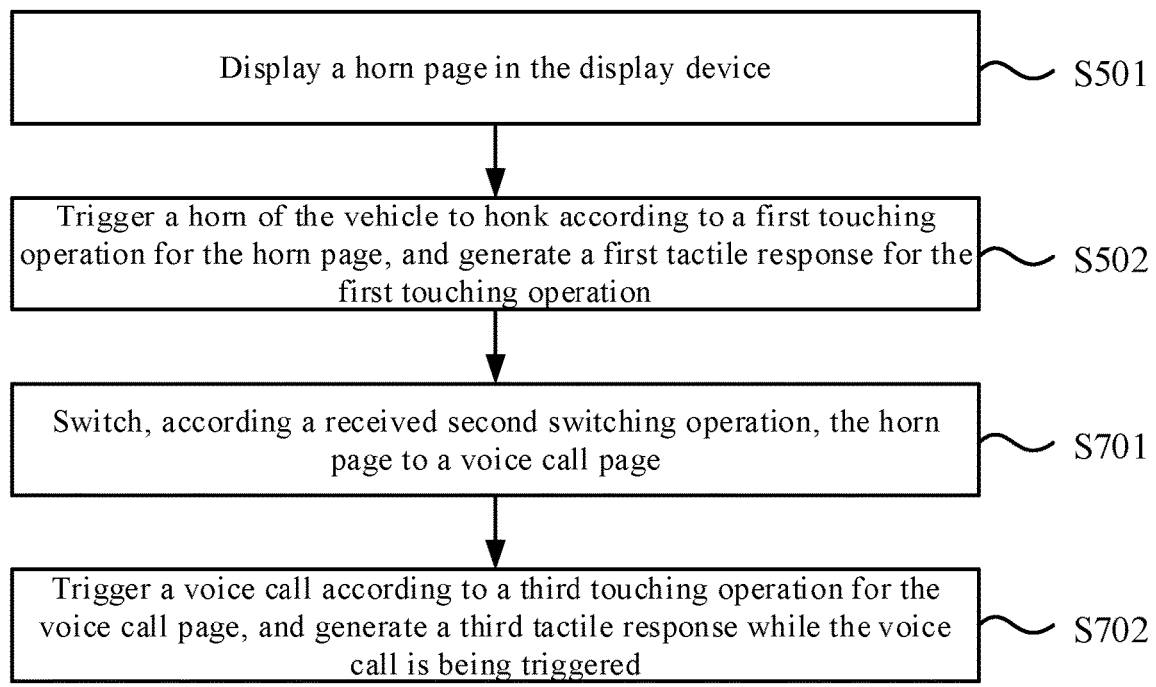
FIG. 7A is a schematic flowchart illustrating another method of controlling a display device according to an embodiment of the present disclosure.

FIG. 7A is a schematic flowchart illustrating a method of controlling a display device according to an embodiment of the present disclosure. As shown in FIG. 7A, the method may further include:

At step 701, according to a received second switching operation, the horn page is switched to a voice call page; and At step 702, according to a third touching operation for the voice call page, a voice call is triggered, and a third tactile response is generated while the voice call is being triggered.

In an embodiment, the voice call page displays at least a selection region and a call region, and the third touching operation includes a selection touching operation for the selection region and a call touching operation for the call region.

According to the third touching operation for the voice call page, triggering the voice call and generating the third tactile response while the voice call is being triggered include:

according to a received selection touching operation, selecting a target contact, and generating a tactile response while the target contact is being selected;

according to a received call touching operation, calling the target contact and generating a tactile response while the target contact is being called.

In an embodiment, the call region includes a central region and an edge region. Generating the tactile response while the target contact is being called includes:

according to a call touching operation for the central region and a call touching operation for the edge region, generating different tactile responses respectively.

In an embodiment, the selection touching operation includes a clockwise touching operation or a counterclockwise touching operation, and generating the tactile response while the target contact is being selected includes:

generating a tactile response with a sense of pause-move while the target contact is being selected.

In an embodiment, the method further includes:
recording a length of time in which no operation for the voice call page is received; and
in response to determining that the recorded length of time is greater than a second predetermined time length, switching from displaying the voice call page to displaying the horn page.

Figure 7B:
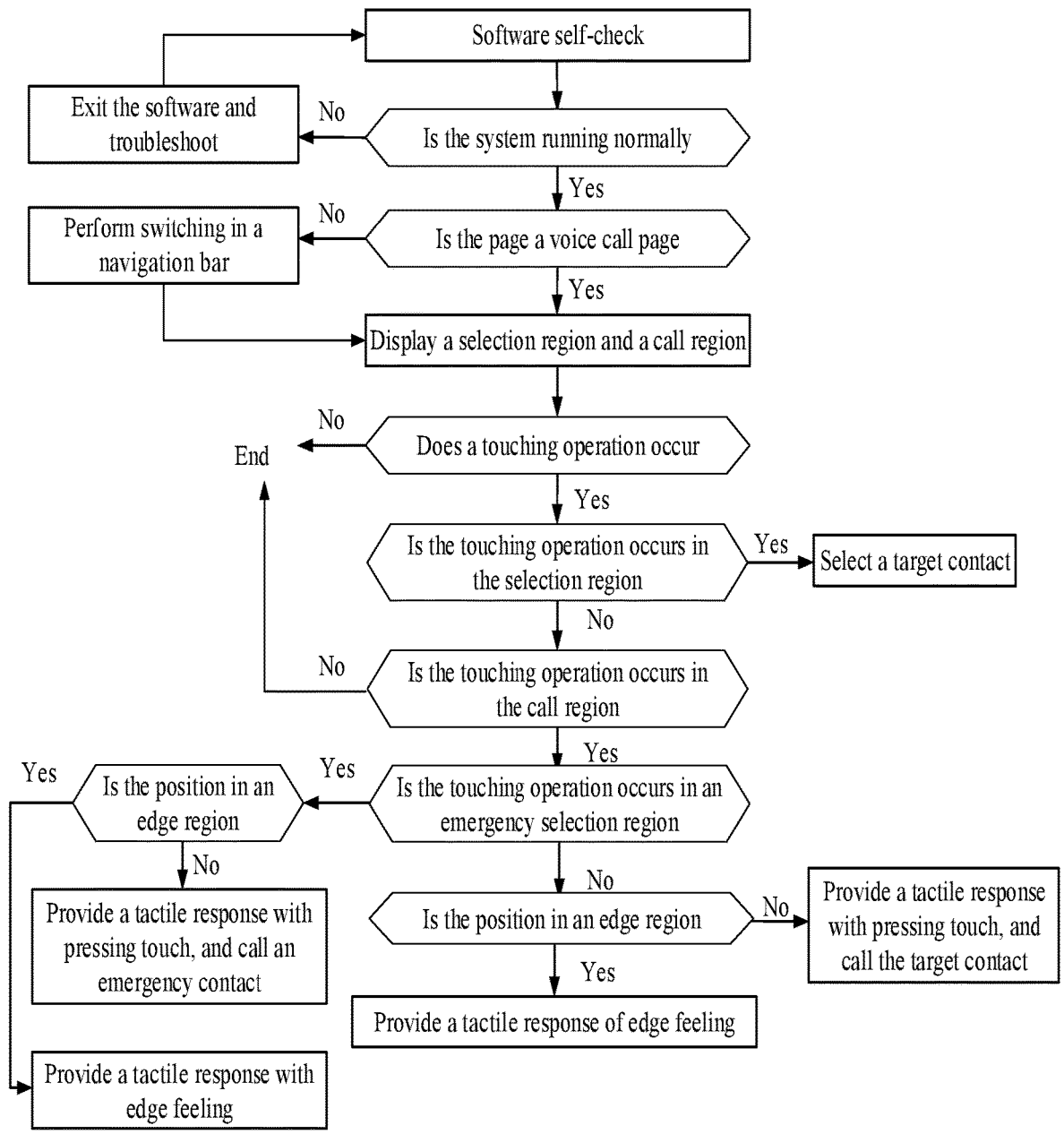
FIG. 7B is a schematic flowchart of a voice call according to an embodiment of the present disclosure.

With an example, a case that the display device displays a voice call page is relatively systematically described below. FIG. 7B is a schematic flowchart of a voice call according to an embodiment of the present disclosure.

Firstly, the display device can start a software and perform self-check to determine whether a system runs normally. In a case that the system does not run normally, the display device can exit the software and try to remove system faults. In a case that the system runs normally, it can be further determined whether the currently-displayed page is the voice call page. In response to determining that the page is not the voice call page, a user can perform a switching operation on a navigation bar as needed to switch to displaying the voice call page. In response to determining that the page is the voice call page, a selection region and a call region can be displayed in the page, for example, as shown in FIG. 4.

Further, whether a touching operation for the voice call page occurs can be determined. In a case that no touching operations occur, the voice call process can be ended; and in a case that a touching operation occurs, it can be determined whether the touching operation occurs in a selection region. In response to determining that the touching operation occurs in the selection region, a selected target contact can be determined, and a tactile response with a sense of pause-move can be generated during the selection. In response to determining that the touching operation does not occur in the selection region, it can be determined whether the touching operation occurs in a call region. In response to determining that the touching operation does not occur in the call region, the voice call process can be ended.

In response to determining that the touching operation occurs in the call region, it can be determined whether the touching operation occurs in an emergency call region. In a case that the touching operation occurs in the emergency call region, it can be further determined whether an edge region or a central region of the emergency call region is touched. In response to determining that the touching operation occurs in the edge region, a relatively strong vibration may be generated as a tactile response, enabling the user to experience a feeling of edges. In response to determining that the touching operation occurs in the central region, a relatively mild vibration may be generated as a tactile response to enable the user to experience pressing touch, and a call to an emergency contact may be made. In response to determining that the touching operation does not occur in the emergency call region, it can be determined whether an edge region or a central region of the call region is touched. In a case that the touching operation occurs in the edge region, a relatively strong vibration may be generated as a tactile response, enabling the user to experience a feeling of edges. In a case that the touching operation occurs in the central region, a relatively mild vibration may be generated as a tactile response to enable the user to experience pressing touch, and a call to the selected target contact may be made.

In the method of the above embodiments, specific implementations for operations corresponding to various steps have already been detailed in the embodiments of the display device, which will not be repeated herein.

An embodiment of the present disclosure further provides a non-transitory computer readable storage medium, storing a computer program. The computer programs are executed by a processor to perform the steps of the method of any one of the above embodiments.

Figure 8:
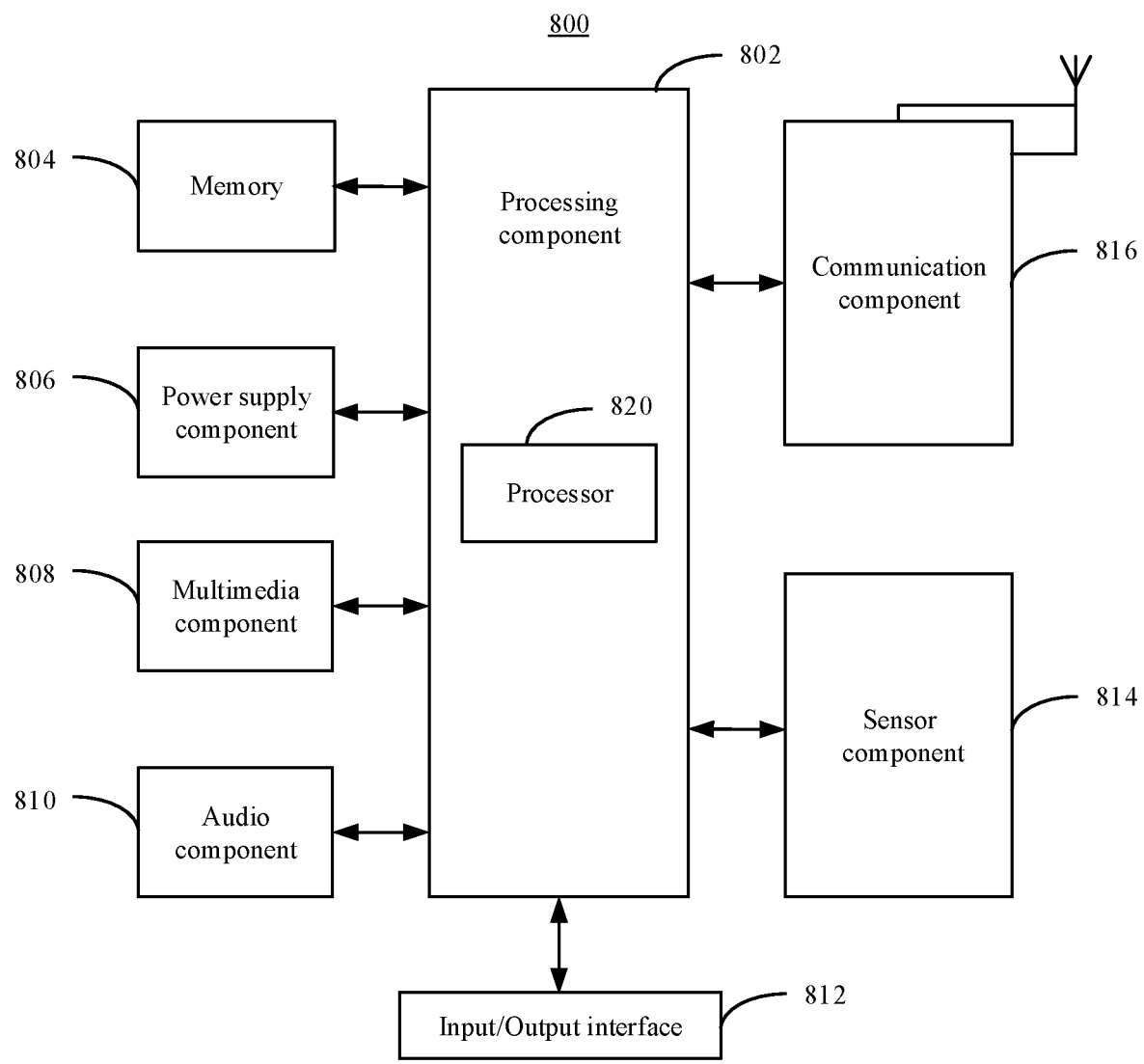
FIG. 8 is a block diagram illustrating a display device according to an embodiment of the present disclosure.

FIG. 8 is a block diagram of a display device 800 according to an embodiment of the present disclosure. For example, the display device 800 may be a mobile phone, a computer, a digital broadcast terminal, a message transceiver, a game console, a tablet device, a medical device, a fitness device, a personal digital assistant, and the like.

As shown in FIG. 8, the display device 800 may include one or more of the following components: a processing component 802, a memory 804, a power supply component 806, a multimedia component 808, an audio component 810, an input/output (I/O) interface 812, a sensor component 814 and a communication component 816.

The processing component 802 generally controls overall operations of the display device 800, such as operations associated with display, phone calls, data communications, camera operations, and recording operations. The processing component 802 may include one or more processors 820 to execute instructions to complete all or part of the steps of the above methods. In addition, the processing component 802 may include one or more modules which facilitate the interaction between the processing component 802 and other components. For example, the processing component 802 may include a multimedia module to facilitate the interaction between the multimedia component 808 and the processing component 802.

The memory 804 is configured to store various types of data to support the operation of the display device 800. Examples of such data include instructions for any application program or method operated on the display device 800, contact data, phonebook data, messages, pictures, videos, and so on. The memory 804 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 806 supplies power for different components of the display device 800. The power supply component 806 may include a power supply management system, one or more power supplies, and other components associated with generating, managing and distributing power for the display device 800.

The multimedia component 808 includes a screen that provides an output interface between the display device 800 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 808 includes a front camera and/or a rear camera. When the display device 800 is in an operation mode, such as a shooting mode or a video mode, the front camera and/or the rear camera may receive external multimedia data. Each of the front and rear cameras may be a fixed optical lens system or have a focal length and an optical zoom capability.

The audio component 810 is configured to output and/or input audio signals. For example, the audio component 810 includes a microphone (MIC) configured to receive an external audio signal when the display device 800 is in an operation mode, such as a call mode, a recording mode, and a voice recognition mode. The received audio signal may be further stored in the memory 804 or transmitted via the communication component 816. In some examples, the audio component 810 also includes a loudspeaker for outputting an audio signal.

The I/O interface 812 provides an interface between the processing component 802 and a peripheral interface module which may be a keyboard, a click wheel, a button, or the like. These buttons may include, but are not limited to a home button, a volume button, a start button, and a lock button.

The sensor component 814 includes one or more sensors for providing a status assessment in various aspects to the display device 800. For example, the sensor component 814 may detect an on/off state of the display device 800, and the relative positioning of components, for example, the component is a display and a keypad of the display device 800. The sensor component 814 may also detect a change in position of the display device 800 or a component of the display device 800, the presence or absence of a user in contact with the display device 800, the orientation or acceleration/deceleration of the display device 800 and a change in temperature of the display device 800. The sensor component 814 may include a proximity sensor configured to detect the presence of nearby objects without any physical contact. The sensor component 814 may also include a light sensor, such as a CMOS or CCD image sensor, for use in imaging applications. In some examples, the sensor component 814 may also include an acceleration sensor, a gyro sensor, a magnetic sensor, a pressure sensor, or a temperature sensor.

The communication component 816 is configured to facilitate wired or wireless communication between the display device 800 and other devices. The display device 800 may access a wireless network based on a communication standard, such as WiFi, 2G or 3G. or 4G LTE or 5G NR or a combination thereof. In an example, the communication component 816 receives broadcast signals or broadcast associated information from an external broadcast management system via a broadcast channel. In an example, the communication component 816 also includes a near field communication (NFC) module to facilitate short range communication. For example, the NFC module may be implemented based on a radio frequency identification (RFID) technology, an infrared data association (IrDA) technology, an ultrawideband (UWB) technology, a Bluetooth (BT) technology, and other technologies.

In an example, the display device 800 may be implemented by one or more application specific integrated circuits (ASICs), digital signal processors (DSPs), digital signal processing devices (DSPDs), programmable logic devices (PLDs), a field programmable gate array (FPGA), a controller, a microcontroller, a microprocessor or other electronic elements for performing the above methods.

In an example, there is also provided a non-transitory computer readable storage medium including instructions, such as a memory 804 including instructions, where the instructions are executable by the processor 820 of the display device 800 to perform the method as described above. For example, the non-transitory computer readable storage medium may be a read only access memory (ROM), a random access memory (RAM) CD-ROM, magnetic tape, floppy disk, or optical data storage device or the like.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The above are detailed descriptions of a method and an apparatus provided according to the embodiments of the present disclosure. Specific examples are used herein to set forth the principles and the implementing methods of the present disclosure, and the descriptions of the above embodiments are only meant to help understanding of the method and the core idea of the present disclosure. Meanwhile, those of ordinary skill in the art may make alterations to the specific embodiments and the scope of application in accordance with the idea of the present disclosure. In conclusion, the contents of the present specification shall not be interpreted as limiting to the present disclosure.

The invention claimed is:

1. A display device, being applied to a steering wheel and comprising a display component, a touch component, a response component and a controller, wherein the response component comprises piezoelectric patches attached to edges of both sides of the display device;
   the display component is configured to display a horn page;
   the touch component is configured to generate a horn touch signal according to a first touching operation occurring on the horn page, and output the horn touch signal to the controller and the response component;
   the controller is configured to trigger a horn to honk according to the horn touch signal; and
   the response component is configured to generate the first tactile response according to the horn touch signal while the horn is honking;
   the touch component is further configured to generate, according to a received second switching operation, a second switching touch signal, and send the second switching touch signal to the controller, wherein the second switching operation comprises a touching operation for a voice call identifier in a navigation bar displayed by the display component;

the controller is further configured to control, according to the second switching touch signal, the display component to switch from displaying the horn page to displaying a voice call page;

the touch component is further configured to generate, according to a received third touching operation for the voice call page, a call touch signal, and send the call touch signal to the controller and the response component;

the controller is further configured to trigger a voice call according to the call touch signal; and the response component is further configured to generate, according to the call touch signal, the third tactile response while the voice call is triggered;

the voice call page comprises a selection region and a call region, and the call region comprises a central region and an edge region;

the touch component is configured to generate a first call touch signal according to a call touching operation for the central region, generate a second call touch signal according to a call touching operation for the edge region, and send the first call touch signal and the second call touch signal to the response component; and the response component is further configured to generate, according to the first call touch signal and the second call touch signal, the fourth tactile response and the fifth tactile response respectively, the fourth tactile response is different from the fifth tactile response; and the piezoelectric patches are configured to generate the first, second, third, fourth and fifth tactile responses by vibrating the edges.

2. The display device of claim 1, wherein the controller is further configured to:

determine, according to the horn touch signal generated by the touch component, touch intensity of the first touching operation; and in response to determining that the touch intensity is greater than or equal to a touch intensity threshold, trigger the horn to honk.

3. The display device of claim 1, comprising a touch effective region and the controller is further configured to:

determine, according to the horn touch signal, a position of the first touching operation; and in response to determining that the position of the first touching operation is within the touch effective region, trigger the horn to honk.

4. The display device of claim 1, wherein the response component is further configured to generate visual feedback while the horn is honking.

5. The display device of claim 1, wherein the controller is further configured to perform at least one of:

controlling, in a duration of the first touching operation, the horn to honk; or controlling, at an end of the first touching operation, the horn to stop honking.

6. The display device of claim 1, wherein the touch component is further configured to generate, according to a received first switching operation, a first switching touch signal, and send the first switching touch signal to the controller, wherein the first switching operation comprises a touching operation for a seat adjustment identifier in a navigation bar displayed in the display component;

the controller is further configured to control, according to the first switching touch signal, the display component to switch from displaying the horn page to displaying a seat adjustment page;

the touch component is further configured to generate, according to a second touching operation for the seat adjustment page, an adjustment touch signal, and send the adjustment touch signal to the controller and the response component;

the controller is further configured to adjust a position of a seat according to the adjustment touch signal; and the response component is further configured to generate, according to the adjustment touch signal, the second tactile response while the position of the seat is being adjusted.

7. The display device of the claim 6, wherein the seat adjustment page displays a seat position of the seat, the touch component is further configured to send the adjustment touch signal to the display component; and the display component is configured to change, according to the adjustment touch signal, the displayed seat position.

8. The display device of claim 6, wherein the seat adjustment page is provided with at least one horizontal position adjustment bar;

the touch component is configured to generate, according to the second touching operation for the horizontal position adjustment bar, a first adjustment touch signal, and transmit the first adjustment touch signal to the controller and the response component;

the controller is configured to adjust, according to the first adjustment touch signal, a horizontal position of the seat; and the response component is configured to generate, according to the first adjustment touch signal, a tactile response of sliding friction while the horizontal position of the seat is being adjusted.

9. The display device of claim 6, wherein the seat adjustment page is provided with at least one seat backrest angle adjustment bar;

the touch component is configured to generate, according to the second touching operation for the seat backrest angle adjustment bar, a second adjustment touch signal, and transmit the second adjustment touch signal to the controller and the response component;

the controller is configured to adjust, according to the second adjustment touch signal, a seat backrest pitch angle; and the response component is configured to generate, according to the second adjustment touch signal, a tactile response of rotating friction while the seat backrest pitch angle is being adjusted.

10. The display device of claim 6, wherein the seat adjustment page is provided with a plurality of adjustment regions;

the touch component is further configured to determine a target region where the second touching operation is located from the plurality of adjustment regions, and indicate to the controller the target region; and the controller is configured to determine an adjustment speed proportion corresponding to the target region, determine an adjustment speed according to the adjustment speed proportion and the adjustment touch signal, and adjust the position of the seat according to the adjustment speed.

11. The display device of claim 6, wherein
the touch component is further configured to record a length of time during which no operation for the seat adjustment page is received, and in response to determining that the recorded length of time is greater than a first predetermined time length, send a first expiration signal to the controller; and
the controller is further configured to control, according to the first expiration signal, the display component to switch from displaying the seat adjustment page to displaying the horn page.

12. The display device of claim 1, wherein the third touching operation comprises a selection touching operation for the selection region and a call touching operation for the call region;
the touch component is further configured to generate a selection touch signal according to the received selection touching operation, and send the selection touch signal to the display component and the response component; the display component is further configured to select a target contact according to the selection touch signal; and the response component is further configured to generate a tactile response while the display component is performing the target contact selection; and
the touch component is further configured to generate a call touch signal according to the received call touching operation, and send the call touch signal to the control component and the response component; the control component is further configured to call the target contact according to the call touch signal; and the response component is further configured to generate a tactile response according to the call touch signal while the target contact is being called.

13. The display device of claim 12, wherein the selection touching operation comprises a clockwise touching operation or a counterclockwise touching operation,
the response component is configured to generate a tactile response with a sense of pause-move while the display component is performing the target contact selection.

14. The display device of claim 1, wherein
the touch component is further configured to record a length of time during which no operation for the voice call page is received, and in response to determining that the recorded length of time is greater than a second predetermined time length, send a second expiration signal to the controller; and
the controller is further configured to control, according the second expiration signal, the display component to switch from displaying the voice call page to displaying the horn page.

15. A method of controlling a display device, wherein the display device is applied to a steering wheel and the method comprises:
displaying a horn page in the display device;
triggering a horn to honk according to a first touching operation for the horn page, and generating a first tactile response while the horn is honking;
switching, according to a received second switching operation, from the horn page to a voice call page;
triggering a voice call according to a third touching operation for the voice call page, and generating a third tactile response while the voice call is triggered;
generating a first call touch signal according to a call touching operation for a central region of a call region displayed on the voice call page;
generating a second call touch signal according to the call touching operation for an edge region of the call region displayed on the voice call page; and
generating, according to the first call touch signal and the second call touch signal, a fourth tactile response and a fifth tactile response respectively;
wherein the first tactile response, a second tactile response, the third tactile response, the fourth tactile response and the fifth tactile response are generated by piezoelectric patches attached to edges of both sides of the display device vibrating the edges, the fourth tactile response is different from the fifth tactile response.

16. The method of claim 15, further comprising:
switching, according to a received first switching operation, from the horn page to a seat adjustment page, wherein the first switching operation comprises a touching operation for a seat adjustment identifier in a navigation bar displayed by the display device; and
adjusting a position of a seat according to a second touching operation for the seat adjustment page, and generating the second tactile response while the position of the seat is being adjusted.

17. A non-transitory computer readable storage medium with a computer program stored thereon, and the program is executed by a processor to perform operations comprising:
displaying a horn page in a display device;
triggering a horn to honk according to a first touch operation for the horn page, and generating a first tactile response while the horn is honking;
switching, according to a received second switching operation, from the horn page to a voice call page;
triggering a voice call according to a third touching operation for the voice call page, and generating a third tactile response while the voice call is triggered;
generating a first call touch signal according to a call touching operation for a central region of a call region displayed on the voice call page;
generating a second call touch signal according to the call touching operation for an edge region of the call region displayed on the voice call page; and
generating, according to the first call touch signal and the second call touch signal, a fourth tactile response and a fifth tactile response respectively, the fourth tactile response is different from the fifth tactile response;
wherein the first tactile response, a second tactile response, the third tactile response, the fourth tactile response and the fifth tactile response are generated by piezoelectric patches attached to edges of both sides of the display device vibrating the edges.

* * * * *